United States Patent
Le et al.

(10) Patent No.: US 12,394,432 B2
(45) Date of Patent: Aug. 19, 2025

(54) NON-LOCALIZED SPIN VALVE READER HYBRIDIZED WITH SPIN ORBIT TORQUE LAYER

(71) Applicants: Western Digital Technologies, Inc., San Jose, CA (US); Tokyo Institute of Technology, Tokyo (JP)

(72) Inventors: Quang Le, San Jose, CA (US); Xiaoyong Liu, San Jose, CA (US); Brian R. York, San Jose, CA (US); Cherngye Hwang, San Jose, CA (US); Son T. Le, San Jose, CA (US); Hisashi Takano, Fujisawa (JP); Fan Tuo, Fujisawa (JP); Hassan Osman, San Jose, CA (US); Nam Hai Pham, Tokyo (JP)

(73) Assignees: Western Digital Technologies, Inc., San Jose, CA (US); Tokyo Institute of Technology, Tokyo (JP)

(*) Notice: Subject to any disclaimer, the term of this patent is extended or adjusted under 35 U.S.C. 154(b) by 0 days.

(21) Appl. No.: 18/367,877

(22) Filed: Sep. 13, 2023

(65) Prior Publication Data
US 2024/0420732 A1    Dec. 19, 2024

Related U.S. Application Data

(60) Provisional application No. 63/521,819, filed on Jun. 19, 2023.

(51) Int. Cl.
G11B 5/31    (2006.01)
(52) U.S. Cl.
CPC ................. G11B 5/315 (2013.01)

(58) Field of Classification Search
None
See application file for complete search history.

(56) References Cited

U.S. PATENT DOCUMENTS 8,717,715 B1 * 5/2014 Sato ............... G01R 33/1284
                                                       360/324
9,633,678 B2 * 4/2017 Deen ............... H01L 29/66984
(Continued)

OTHER PUBLICATIONS

Hao, Runzi et al., "Micromagnetic simulation of Gigahertz Current Induced Magnetization Switching in a Synthetic Antiferromagnetic Free Layer", The Magnetic Recording Conference, 2023, pp. 86-87, <https://sites.google.com/umn.edu/tmrc2023/>.

Primary Examiner — William J Klimowicz
(74) Attorney, Agent, or Firm — PATTERSON + SHERIDAN, LLP

(57) ABSTRACT

The present disclosure generally relates to a magnetic recording head comprising a read head. The read head comprises a sensor disposed at a media facing surface (MFS) and a spin generator spaced from the sensor and recessed from the MFS. The sensor and spin generators are disposed on a non-magnetic layer. The sensor comprises a free layer and the spin generator comprises at least one spin orbit torque (SOT) layer. The SOT layer may comprise topological material such as BiSb. The sensor is configured to detect a read signal using a first voltage lead and a second voltage lead. The spin generator is configured to inject spin current through the non-magnetic layer to the sensor using a first current lead and a second current lead. The shape of the non-magnetic layer is a triangular or trapezoidal shape to further concentrate spin current.

28 Claims, 14 Drawing Sheets

(56) References Cited

U.S. PATENT DOCUMENTS

| | | | |
|---|---|---|---|
| 9,685,178 B1* | 6/2017 | Deen | G11B 5/398 |
| 9,934,798 B1* | 4/2018 | Deen | G11B 5/3163 |
| 9,947,347 B1 | 4/2018 | Van Der Heijden et al. | |
| 10,210,888 B1* | 2/2019 | Li | G11C 11/18 |
| 11,094,338 B1* | 8/2021 | Hwang | G11B 5/39 |
| 11,222,656 B1* | 1/2022 | Le | G11B 5/372 |
| 11,282,538 B1 | 3/2022 | Kief | |
| 2004/0101702 A1* | 5/2004 | Kim | B82Y 40/00 |
| | | | 428/492 |
| 2009/0154030 A1* | 6/2009 | Yamada | G11B 5/3909 |
| | | | 360/322 |
| 2012/0211848 A1 | 8/2012 | Sasaki et al. | |
| 2013/0258524 A1 | 10/2013 | Sasaki et al. | |
| 2015/0029609 A1* | 1/2015 | Kamiguchi | G11B 5/35 |
| | | | 335/219 |
| 2015/0035524 A1 | 2/2015 | Sasaki et al. | |
| 2016/0099015 A1 | 4/2016 | Kamiguchi et al. | |
| 2016/0154071 A1 | 6/2016 | Sasaki | |
| 2017/0011757 A1* | 1/2017 | Hashimoto | G11B 5/3909 |
| 2017/0092302 A1* | 3/2017 | Deen | H10N 50/20 |
| 2018/0351082 A1* | 12/2018 | Sasaki | H10N 50/85 |
| 2020/0279992 A1* | 9/2020 | Pham | H10N 52/80 |
| 2023/0063084 A1* | 3/2023 | Pham | H10N 52/00 |
| 2023/0306993 A1* | 9/2023 | Le | G11B 5/39 |
| 2024/0144960 A1* | 5/2024 | Le | G11B 5/3912 |
| 2024/0144965 A1* | 5/2024 | Le | G11B 5/3133 |
| 2024/0240994 A1* | 7/2024 | Le | G11B 5/3906 |

* cited by examiner

NON-LOCALIZED SPIN VALVE READER HYBRIDIZED WITH SPIN ORBIT TORQUE LAYER

CROSS-REFERENCE TO RELATED APPLICATIONS

This application claims benefit of U.S. provisional patent application Ser. No. 63/521,819, filed Jun. 19, 2023, which is herein incorporated by reference.

BACKGROUND OF THE DISCLOSURE

Field of the Disclosure

Embodiments of the present disclosure generally relate to a magnetic recording head comprising a read head, such as a magnetic media drive or magnetic disk drive.

Description of the Related Art

At the heart of a computer is a magnetic disk drive. Information is written to and read from a disk as the disk rotates past read and write heads that are positioned very closely to the magnetic surface of the disk. There have been various read head designs proposed to boost linear density based on different physical mechanisms such as a tunneling magneto-resistive (TMR) effect, a magneto-resistance (GMR) effect, an extraordinary magneto-Resistive (EMR) effect, a spin torque oscillator (STO) effect, and non-localize spin valve (NLSV).

In NLSV design, the read head may include two spatially separated tunnel junction structures, with one tunnel junction structure being recessed from a media facing surface (MFS) and the other structure being disposed at the MFS. The recessed structure often comprises a pinned layer and a ferromagnetic layer having a fixed magnetization for spin injection. However, the reader signal output in such read heads is limited by the spin injection efficiency from the pinned layer, which has a spin polarization of less than 1. As such, the relatively low spin current injection results in poor signal output, negatively impacting the read head's ability to accurately read data.

Therefore, there is a need in the art for improved read heads having high signal outputs for use in magnetic recording devices.

SUMMARY OF THE DISCLOSURE

The present disclosure generally relates to a magnetic recording head comprising a read head. The read head comprises a sensor disposed at a media facing surface (MFS) and a spin generator spaced from the sensor and recessed from the MFS. The sensor and the spin generator are disposed on a non-magnetic layer. The sensor comprises a free layer and the spin generator comprises at least one spin orbit torque (SOT) layer. The SOT layer may comprise BiSb. The sensor is configured to detect a read signal using a first voltage lead and a second voltage lead. The spin generator is configured to inject spin current through the non-magnetic layer to the sensor using a first current lead and a second current lead. The shape of the non-magnetic layer is a triangular or trapezoidal shape to further concentrate spin current.

In one embodiment, a read head comprises a first shield, a second shield, a non-magnetic layer disposed between the first shield and the second shield, a sensor disposed between the non-magnetic layer and the second shield at a media facing surface (MFS), the sensor comprising a free layer, and a spin generator disposed adjacent to the non-magnetic layer and recessed from the MFS by a first distance, the spin generator being spaced from the sensor, wherein the spin generator comprises a spin orbit torque (SOT) layer and wherein the first distance is greater than a height of the free layer as measured from the MFS.

In another embodiment, a magnetic recording device comprises a read head, the read head comprising: a first shield, the first shield comprising a shield notch, a second shield, a non-magnetic layer disposed between the shield notch and the second shield, a sensor disposed between the non-magnetic layer and the second shield at a media facing surface (MFS), the sensor comprising a free layer, and a spin generator recessed from the MFS, the spin generator being spaced from the sensor, wherein the spin generator comprises: a first spin orbit torque (SOT) layer disposed between the first shield and the non-magnetic layer, and a second SOT layer disposed between the non-magnetic layer and the second shield.

In yet another embodiment, a magnetic recording device comprises a read head, the read head comprising: a first shield, a second shield, a non-magnetic layer disposed between the first shield and the second shield, a sensor disposed between the first shield and the second shield at a media facing surface (MFS), the sensor comprising a first free layer and a second free layer, and a spin generator recessed from the MFS, the spin generator being spaced from the sensor, wherein the spin generator comprises: a first spin orbit torque (SOT) layer disposed between the first shield and the non-magnetic layer, and a second SOT layer disposed between the non-magnetic layer and the second shield.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a magnetic recording head comprising a read head. The read head comprises a sensor disposed at a media facing surface (MFS) and a spin generator spaced from the sensor and recessed from the MFS. The sensor and the spin generators are disposed on a non-magnetic layer. The sensor comprises a free layer and the spin generator comprises at least one spin orbit torque (SOT) layer. The SOT layer may comprise BiSb. The sensor is configured to detect a read signal using a first voltage lead and a second voltage lead. The spin generator is configured to inject spin current through the non-magnetic layer to the sensor using a first current lead and a second current lead. The shape of the non-magnetic layer is a triangular or trapezoidal shape to further concentrate spin current.

Figure 1:
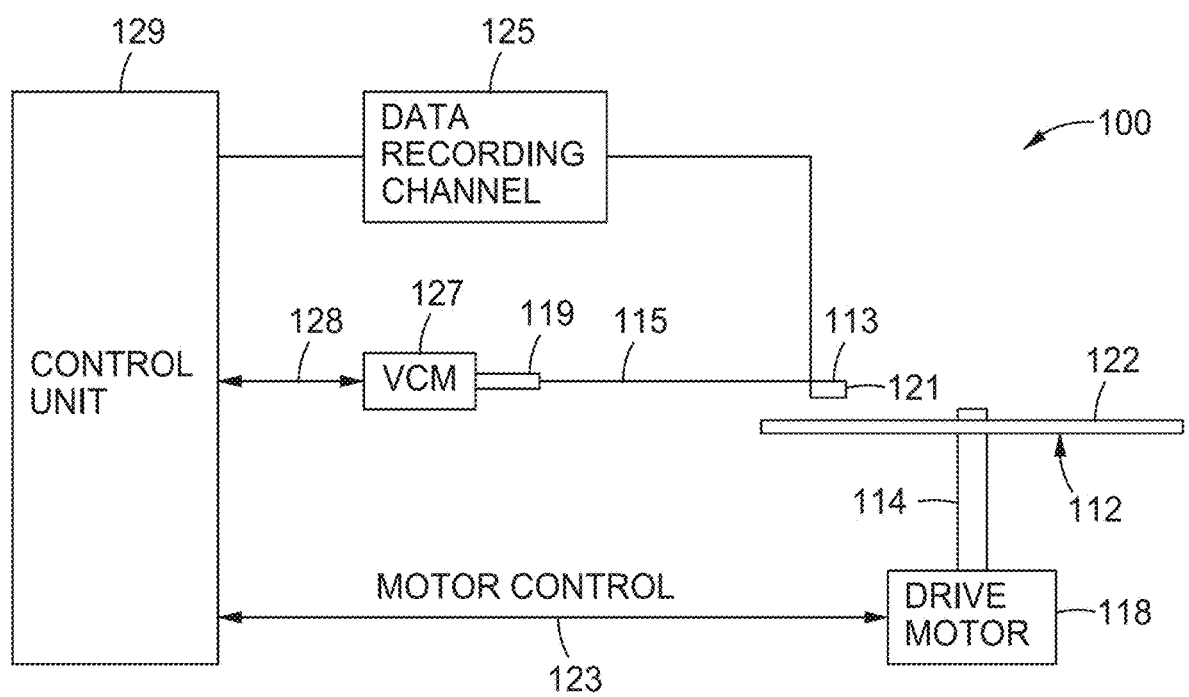
FIG. 1 illustrates a disk drive embodying this disclosure.

FIG. 1 is a schematic illustration of a magnetic recording device 100, according to one implementation. The magnetic recording device 100 includes a magnetic recording head, such as a write head. The magnetic recording device 100 is a magnetic media drive, such as a hard disk drive (HDD). Such magnetic media drives may be a single drive/device or include multiple drives/devices. For the ease of illustration, a single disk drive is shown as the magnetic recording device 100 in the implementation illustrated in FIG. 1. The magnetic recording device 100 (e.g., a disk drive) includes at least one rotatable magnetic disk 112 supported on a spindle 114 and rotated by a drive motor 118. The magnetic recording on each rotatable magnetic disk 112 is in the form of any suitable patterns of data tracks, such as annular patterns of concentric data tracks on the rotatable magnetic disk 112.

At least one slider 113 is positioned near the rotatable magnetic disk 112. Each slider 113 supports a head assembly 121. The head assembly 121 includes one or more magnetic recording heads (such as read/write heads), such as a write head including a spintronic device. As the rotatable magnetic disk 112 rotates, the slider 113 moves radially in and out over the disk surface 122 so that the head assembly 121 may access different tracks of the rotatable magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by a control unit 129.

The head assembly 121, such as a write head of the head assembly 121, includes a media facing surface (MFS) such as an air bearing surface (ABS) that faces the disk surface 122. During operation of the magnetic recording device 100, the rotation of the rotatable magnetic disk 112 generates an air or gas bearing between the slider 113 and the disk surface 122 which exerts an upward force or lift on the slider 113. The air or gas bearing thus counter-balances the slight spring force of suspension 115 and supports the slider 113 off and slightly above the disk surface 122 by a small, substantially constant spacing during operation.

The various components of the magnetic recording device 100 are controlled in operation by control signals generated by control unit 129, such as access control signals and internal clock signals. The control unit 129 includes logic control circuits, storage means and a microprocessor. The control unit 129 generates control signals to control various system operations such as drive motor control signals on a line 123 and head position and seek control signals on a line 128. The control signals on line 128 provide the desired current profiles to optimally move and position slider 113 to the desired data track on rotatable magnetic disk 112. Write and read signals are communicated to and from the head assembly 121 by way of recording channel 125. In one embodiment, which can be combined with other embodiments, the magnetic recording device 100 may further include a plurality of media, or disks, a plurality of actuators, and/or a plurality number of sliders.

Figure 2:
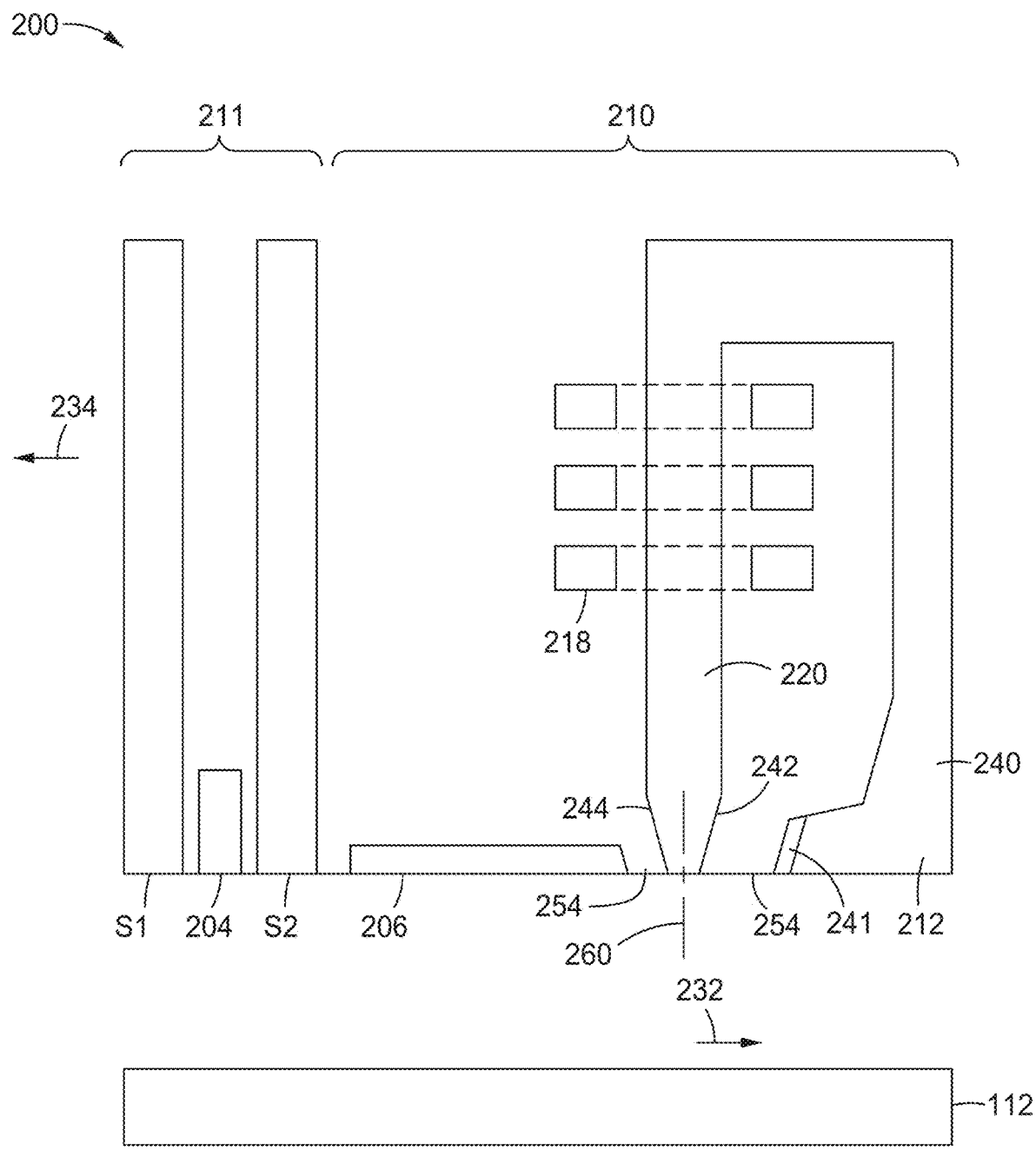
FIG. 2 is a fragmented, cross-sectional side view through the center of a read/write head facing a magnetic media, according to one embodiment.

FIG. 2 is a schematic illustration of a cross sectional side view of a head assembly 200 facing the rotatable magnetic disk 112 shown in FIG. 1 or other magnetic storage medium, according to one implementation. The head assembly 200 may correspond to the head assembly 121 described in FIG. 1. The head assembly 200 includes a MFS 212, such as an ABS, facing the rotatable magnetic disk 112. As shown in FIG. 2, the rotatable magnetic disk 112 relatively moves in the direction indicated by the arrow 232 and the head assembly 200 relatively moves in the direction indicated by the arrow 234.

In one embodiment, which can be combined with other embodiments, the head assembly 200 includes a magnetic read head 211. The magnetic read head 211 may include a sensing element 204 disposed between shields S1 and S2. The sensing element 204 and related structures will be further described with respect to various embodiments shown in the disclosure. The magnetic fields of magnetized regions in the rotatable magnetic disk 112, such as perpendicular recorded bits or longitudinal recorded bits, are detectable by the sensing element 204 as the recorded bits.

The head assembly 200 includes a write head 210. In one embodiment, which can be combined with other embodiments, the write head 210 includes a main pole 220, a leading shield 206, a trailing shield (TS) 240, and an optional spintronic device (not shown) disposed between the main pole 220 and the TS 240. Each of the main pole 220, the spintronic device, the leading shield 206, and the TS 240 has a front portion at the MFS.

The main pole 220 includes a magnetic material, such as CoFe, CoFeNi, NiFe or FeNiRe, other suitable magnetic materials. In one embodiment, which can be combined with other embodiments, the main pole 220 includes small grains of magnetic materials in a random texture, such as body-centered cubic (BCC) materials formed in a random texture. In one example, a random texture of the main pole 220 is formed by electrodeposition. The write head 210 includes a coil 218 around the main pole 220 that excites the main pole 220 to produce a writing magnetic field for affecting a magnetic recording medium of the rotatable magnetic disk 112. The coil 218 may be a helical structure or one or more sets of pancake structures.

In one embodiment, which can be combined with other embodiments, the main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree or different degree of taper with respect to a longitudinal axis 260 of the main pole 220. In one embodiment, which can be combined with other embodiments, the main pole 220 does not include the trailing taper 242 and the leading taper 244. In such an embodiment, the main pole 220 includes a trailing side and a leading side in which the trailing side and the leading side are substantially parallel.

The TS 240 includes a magnetic material, such as FeNi, or other suitable magnetic materials, serving as a second electrode and return pole for the main pole 220. The leading shield 206 may provide electromagnetic shielding and is separated from the main pole 220 by a leading gap 254.

Figure 3:
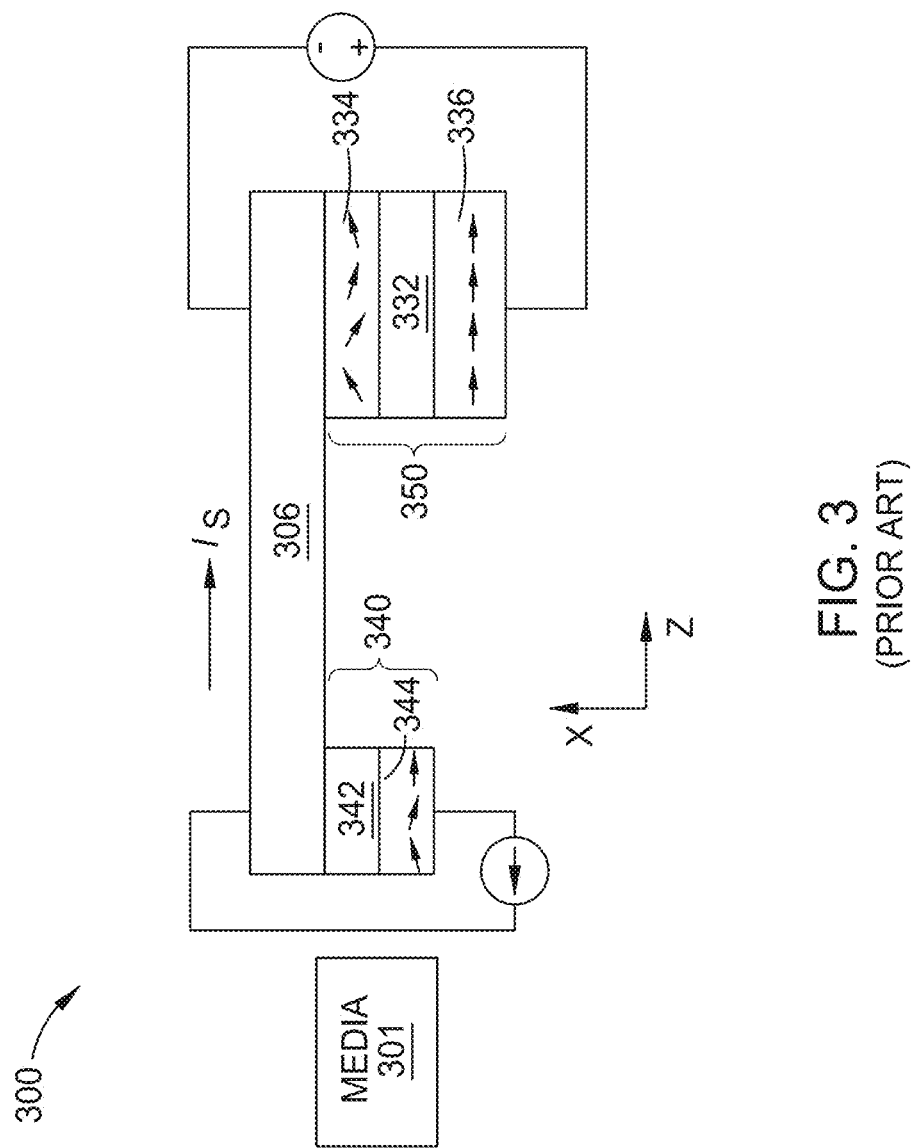
FIG. 3 illustrates prior art of a read head based on NLSV.

FIG. 3 illustrates a read head 300 based on prior art using NLSV. The read head 300 comprises a read sensor 340 disposed at the MFS adjacent to a media 301 and a spin generator 350 recessed from the MFS. The read sensor 340 and the spin generator 350 are each individually disposed between a first shield (not shown) and the second shield (not shown), and are separate, with the read sensor 340 being exposed to MFS and the spin generator 350 been recessed from MFS. The read sensor 340 and the spin generator 350 are also spaced from each other by some finite distance. A non-magnetic layer 306 is disposed adjacent to each of the sensor 340 and spin generator 350. The non-magnetic layer 306 may comprise Al, for example.

The read sensor 340 comprises a first free layer 344 and a first tunnel barrier layer 342 disposed between the first free layer 344 and the non-magnetic layer 306. Voltage leads are connected to the non-magnetic layer 306 and the first free layer 344 for read signal detection through the read sensor 340.

The spin generator 350 comprises a reference layer 336, a cap layer 332 disposed on the reference layer 336, and a second magnetic layer (FM) layer 334 disposed between the non-magnetic layer 306 and second the tunnel barrier layer 332. The spin generator 350 is spaced a distance of about up to a spin diffusion length of the non-magnetic layer 306 from the read sensor 340. For instance, if the non-magnetic layer 306 is made of Cu, the distance can be up to about 100 nm to about 300 nm. Current leads are connected to the non-magnetic layer 306 and the reference layer 336 for spin current generator. During operation, when an electrical current is applied and applied through the spin generator 350, a spin current travels from the spin generator 350 down through the non-magnetic layer 306 to the read sensor 340. The spin injection allows the spin current to flow to the read sensor 340, enabling the signal detection from the first free layer 344's magnetization changes when reading data.

However, since the spin generator 350 comprises a reference layer 336 having a fixed magnetization direction, the spin injection efficiency is limited by the spin polarization of the reference layer 336 which less than about 1. As such, the reader signal output of the read head 300 is limited.

Figure 4A:
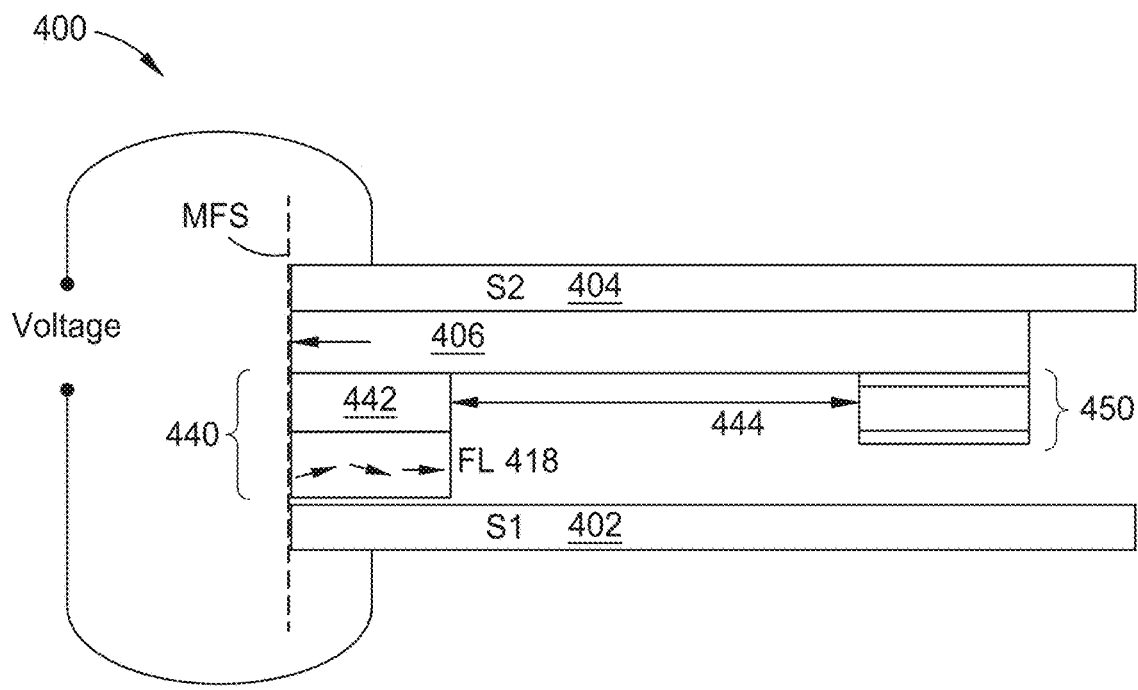
FIGS. 4A-4B illustrate a read head, according to one embodiment.
Figure 4B:
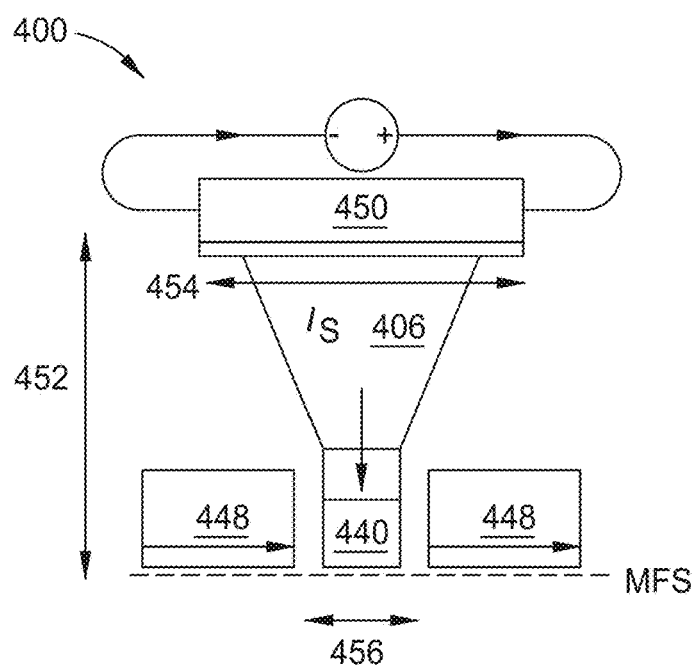

FIGS. 4A-4B illustrate a read head 400, according to one embodiment. FIG. 4A illustrates a cross-sectional view of the read head 400 and FIG. 4B illustrates a top view of the read head 400. The read head 400 may be within the read head 211 of FIG. 2. The read head 400 may be a part of the magnetic recording device 100 of FIG. 1. In the top view of FIG. 4B, the first shield (S1) 402 and the second shield (S2) 404 are not shown for clarity purposes. The first shield 402 may be the S1 of FIG. 2, and the second shield 404 may be the S2 of FIG. 2.

The read head 400 comprises a read sensor 440 disposed at the MFS and a spin generator 450 recessed from the MFS. The read sensor 440 is disposed between the first shield 402 and the second shield 404. A non-magnetic spin transport layer 406 is disposed between the second shield 404 and between the read sensor 440 and the spin generator 450. The non-magnetic layer 406 extends from the MFS to a back edge of the spin generator 450, and may have same height from the MFS as the first and second shields 402, 404.

In some embodiments, the non-magnetic layer 406 may have a greater height than the first and second shields 402, 404, or a smaller height than the first and second shields 402, 404 (the configuration shown in FIG. 4A). The non-magnetic layer 406 has a height 452 of less than, or closer to, the spin diffusion length of the non-magnetic layer 406, generally of about 100 nm to about 300 nm, depending on material used in the non-magnetic layer 406. The non-magnetic layer 406 may comprise a material having a long spin diffusion length, such as Cu, Al, or some other 2D materials, such as graphene, and other van der Waals material, like $MoS_2$, $HfS_2$, etc. The read sensor 440 is spaced a distance 444 of about 100 nm to about 300 nm from the spin generator 450. In addition, the first and second shields 402 and 404 may have different dimensions (different heights from MFS).

Depending on (1) the respective heights of the first shield 402 and the second shield 404, and (2) the spin diffusion characteristics of the non-magnetic layer 406 (which influences the recess spacing of the spin generator 450), the spin generator 450 may or may not be between the two shields. While FIGS. 4A-9B show one or more spin generator between the shields and the shields are relatively similar or the same in dimensions, the disclosure is not so limited and there are other embodiments where the spin generator 450 may not be between the two shields. In those embodiments, a portion of the non-magnetic layer 406 that overlaps with the sensor could be between the two shields, but another portion of the non-magnetic layer 406 that overlaps with the spin generator 450 may not be.

The read sensor 440 comprises a free layer 418 disposed adjacent to the first shield 402 and a tunnel barrier layer 442 disposed between the free layer 418 and the non-magnetic layer 406. The free layer 418 may comprise a magnetic material such as one or more layers of Co—Fe, Co—Fe—B, Pt, or a Heusler alloy. The tunnel barrier layer 442 may comprise MgO or AlOx, for example, where x is a numeral greater than 1. Voltage leads are connected to the first and second shields 402, 404 for read signal detection through the read sensor 440.

The spin generator 450 is a multilayer structure. The spin generator 450, or the recessed read sensor 450, may be any of the read sensors 500-900 discussed below in FIGS. 5A-9B. Electrical current leads are connected to the spin generator 450 for spin injection. During operation, when a current is applied to the read head 400 inside of the spin generator 450 plane, due to a spin Hall effect, there will be a spin current generated that flows across the spin generator 450 into the non-magnetic layer 406. This spin current travels from the spin generator 450 down through the non-magnetic layer 406 to the read sensor 440. This spin current flowing through the read sensor 440 enables an electrical signal generation across the sensor 440 when the free layer 418 rotates its magnetization directions when reading data.

As shown in FIG. 4B, the non-magnetic layer 406 may have a triangular or trapezoidal shape such that the non-magnetic layer 406 is wider further away from the MFS and narrows as the non-magnetic layer 406 gets closer to the MFS. In such embodiments, the wider portion of the non-magnetic layer 406 has a width 454 of less than or equal to about 100 nm, and the narrower portion of the non-magnetic layer 406 has a width 456 of about 10 nm to about 20 nm, which is closer to a track width (TW) of the read sensor 440. The free layer 418 of the sensor 440 may have a same width 456 as the narrower portion of the non-magnetic layer 406. The spin generator 450 is disposed on a wider part of the non-magnetic layer 406 when the non-magnetic layer 406 varies in width. Side shields 448 are disposed on either side the read sensor 440 at the MFS for the proper biasing of the free layer 418.

Figure 4C:
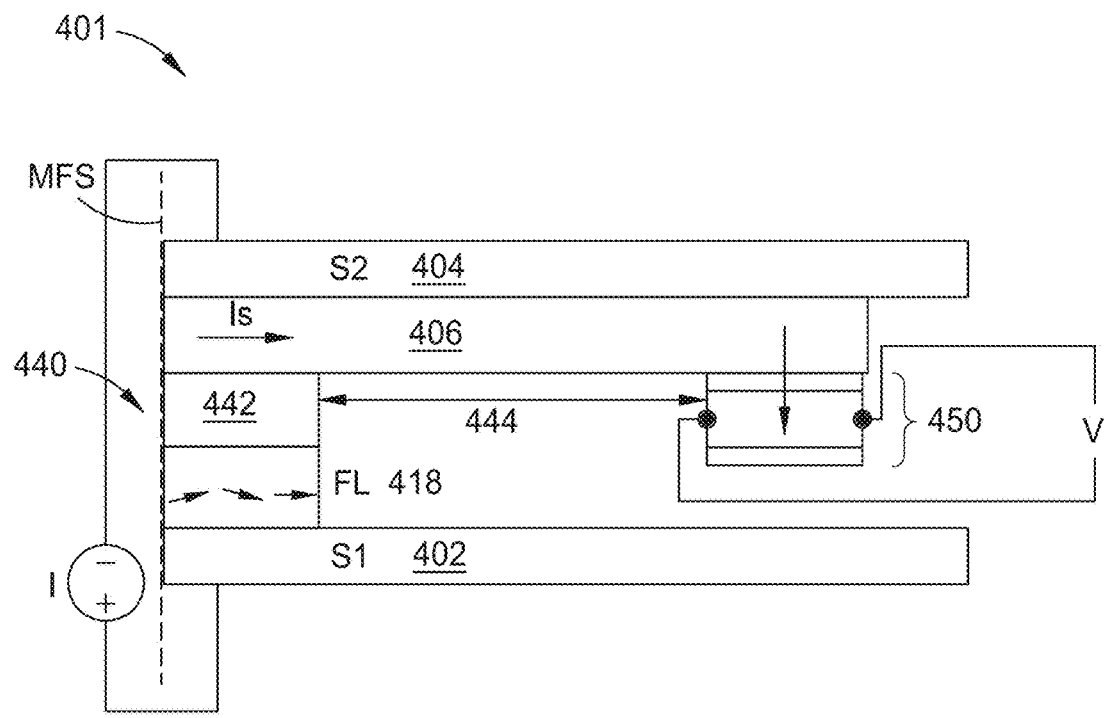
FIGS. 4C-4D illustrate a read head, according to another embodiment.
Figure 4D:
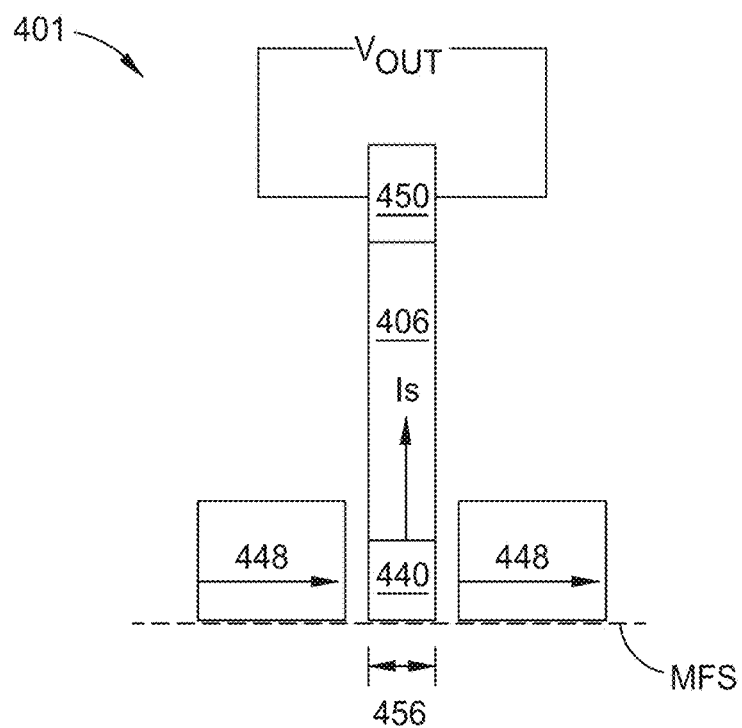

FIGS. 4C-4D illustrate a read head 401, according to one embodiment. FIG. 4C illustrates a cross-sectional view of the read head 401 and FIG. 4D illustrates a top view of the read head 401. The read head 401 may be within the read head 211 of FIG. 2. The read head 401 may be a part of the magnetic recording device 100 of FIG. 1. In the top view of FIG. 4D, the first shield (S1) 402 and the second shield (S2) 404 are not shown for clarity purposes.

The read head 401 of FIGS. 4C-4D is similar to the read head 400 of FIGS. 4A-4B; however, the spin generator 450 serves the function of spin detection, and will be referred to herein as a spin detector 450 or spin detector layer 450, and the current and voltage leads are reversed, resulting in the direction the generated spin current flows through the non-magnetic layer 406 being reversed. In the read head 401, input current leads (I) are connected to the first shield 402 and to the second shield 404, and voltage leads (V) are connected to the spin detector 450. During operation, when a current is applied to read head 401, a spin current ($I_s$) from the FL 418 is generated and flows across the read sensor 440 into the non-magnetic layer 406. The spin current travels from the read sensor 440 up through the non-magnetic layer 406 to the spin detector 450. The vertical spin current flowing through the spin detector 450 enables an electrical signal/voltage generation across the side (cross-track direction) of the spin detector 450 due to the inverse spin Hall effect. When the free layer 418 rotates its magnetization directions when reading data, spin polarization of the spin current ($I_s$) will change, resulting in an output voltage (Vout) across the spin detector 450 reflecting the magnetic bit information on the recording track.

Furthermore, when the current leads (I) are connected to the first shield 402 and to the second shield 404, and voltage leads (V) are connected to the spin detector 450, the non-magnetic layer 406 has a rectangular shape. In such embodiments, the non-magnetic layer 406 has a consistent narrow width 456 of about 10 nm to about 20 nm, which is closer to a track width (TW) of the read sensor 440.

FIGS. 5A-9B illustrate various embodiments of read heads 500, 501, 600, 601, 700, 701, 800, 801, 900, respectively, according to various embodiments. Each read head 500, 600, 700, 800, 900 may individually be the read head 400 of FIGS. 4A-4B. Each read head 501, 601, 701, 801 may individually be the read head 401 of FIGS. 4C-4D. Each read head 500, 501, 600, 601, 700, 701, 800, 801, 900 may individually be within the read head 211 of FIG. 2. Each read head 500, 501, 600, 601, 700, 701, 800, 801, 900 may individually be a part of the magnetic recording device 100 of FIG. 1. Aspects of FIGS. 5A-9B may not be shown to scale, such as the height of the first and second shields 402, 404 in the x-direction. Furthermore, aspects of each read head 500, 501, 600, 601, 700, 701, 800, 801, 900 may be used in combination with one another and/or with the read head 400 of FIGS. 4A-4B and/or the read head 401 of FIGS. 4C-4D. As such, various layers and/or aspects of the read heads 400, 401, 500, 501, 600, 601, 700, 701, 800, 801, 900 may have consistent reference numerals.

Figure 5A:
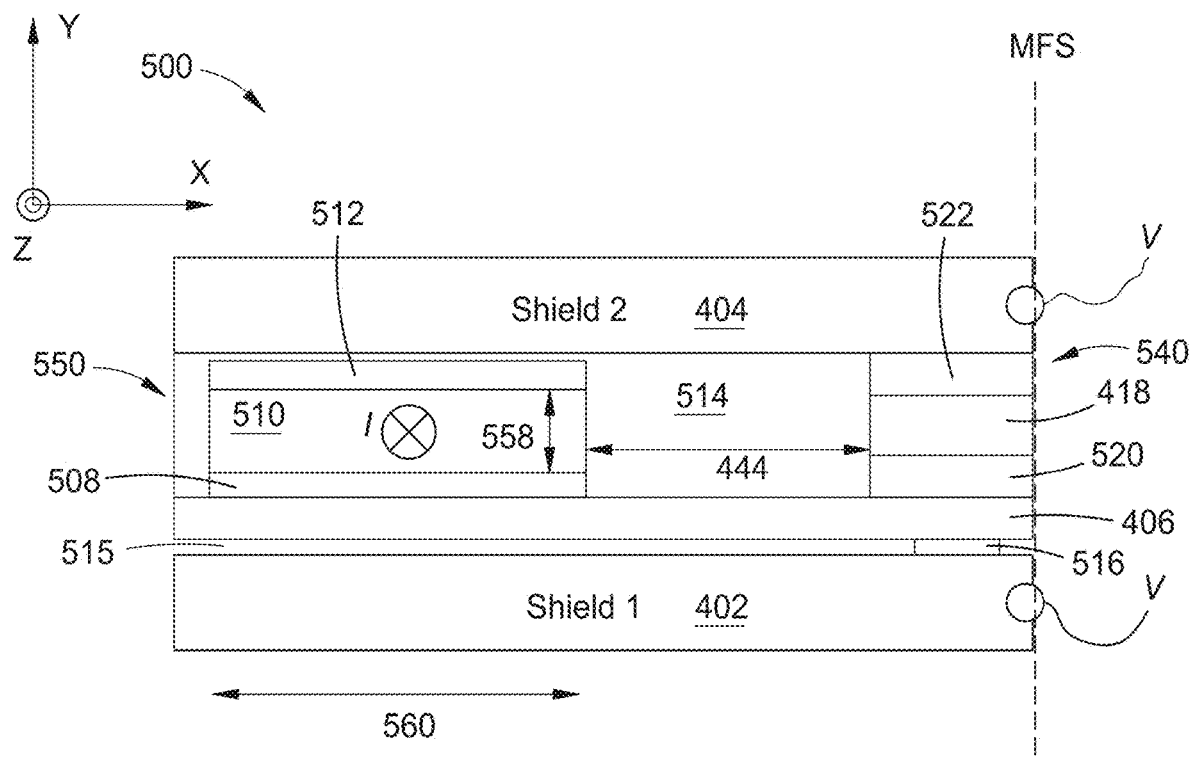
FIGS. 5A-5B illustrate a read head of a magnetic recording head, according to one embodiment.
Figure 5B:
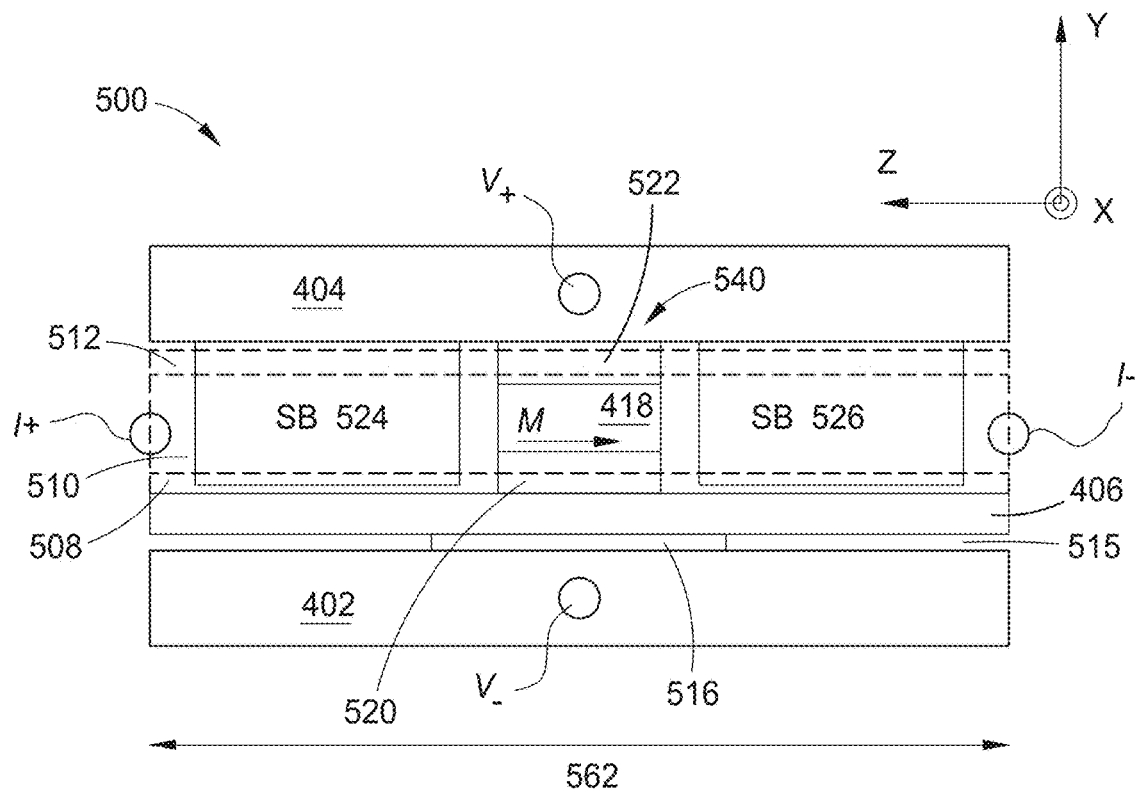

FIGS. 5A-5B illustrate a read head 500 of a magnetic recording head, according to one embodiment. FIG. 5A illustrates a cross-sectional view of the read head 500 and FIG. 5B illustrates a MFS view of the read head 500.

The read head 500 comprises the first shield 402, the second shield 404, the non-magnetic layer 406, a read sensor 540 disposed at the MFS, and a spin generator or spin generation structure 550 recessed from the MFS. A notch 516 is disposed between the first shield 402 and the non-magnetic layer 406 recessed from the MFS. The notch 516 can be recessed a distance of about 0 nm to about 20 nm from the MFS. The notch 516 has a thickness in the y-direction of about 5 nm to about 20 nm and a height in the x-direction of about 5 nm to about 20 nm. A dielectric layer 515 is disposed in front of the notch 516 at the MFS and behind the notch 516 recessed from the MFS. The dielectric layer 515 spaces the first shield 402 from the non-magnetic layer 406. The dielectric layer 515 may comprise SiN, $SiO_2$, MgO, AlO, AlN, or combinations thereof. The read sensor 540 comprises a first tunnel barrier layer 520 disposed on the non-magnetic layer 406, a free layer 418 disposed on the first tunnel barrier layer 520, and a cap layer 522, which may comprise a conductive material, disposed on the free layer 418 and in contact with the second shield 404. As shown in FIG. 5B, a spin orbit torque (SOT) layer 510 has a greater overall size than the free layer 418 along the X and Z directions. A magnetization (M) direction of the free layer 418 is in the −z-direction during operation, which is in the same direction of magnetization of soft bias (SB) side shield 526.

As shown in FIG. 5A, an insulating layer 514 is disposed behind the sensor 540 recessed from the MFS. The spin generator 550 is disposed adjacent to the insulating layer 514. The spin generator 550 comprises a seed layer 508 disposed on the non-magnetic layer 406, the SOT layer 510 (which may be referred to herein as a BiSb layer 510 in certain embodiments where the SOT layer comprises BiSb) disposed on the seed layer 508, and a cap layer 512 disposed on the SOT layer 510. The cap layer 512 may comprise a non-magnetic, high resistivity material, such as Ru, NiFeG, or some oxide materials, for example. In some embodiments, the insulating layer 514 extends over the cap layer 512 and behind the spin generator 550, like shown in FIG.

5A. The insulating layer 514 may comprise SiN, SiO$_2$, MgO, AlO, AlN, or combinations thereof. As discussed above, a first voltage lead (V−) is connected to the first shield 402, and a second voltage lead (V+) is connected to the second shield 404 for read signal detection across the first read sensor 540. The first shield 402, the second shield 404, and the notch 516 may each individually comprise a magnetic material similar to the soft bias material, such as NiFe, NiFe/CoFe laminates, NiFe/NiFeCr laminates, or NiFe/W laminates, for example ("/" as used here denotes separate layers in a multi-layer stack).

As shown in the MFS view of FIG. 5B, the read head 500 further comprises a first soft bias (SB) side shield 524 and a second SB shield 526 each adjacent to the sensor 540. The first and second SB side shields 524, 526 may each individually comprise NiFe, CoFe, and other magnetic materials for proper free layer biasing across track (i.e., the z-direction in FIG. 5B). A first current lead (I+) and a second current lead (I−) are connected to the SOT layer 510 for spin injection. From FIG. 5A, the electrical current flows through the SOT layer 510 into the page, or the z-direction. During operation, when this in-plane (in plane of the SOT layer 510) current is applied to the read head 500, a spin accumulation will occur, and hence a spin current is generated in the non-magnetic layer 406 due to a spin Hall effect. This spin current travels from the spin generator 550 down through the non-magnetic layer 406 to the read sensor 540. This spin current flowing to the read sensor 540 enables an electrical signal generation across the sensor 540 when the free layer 418 rotates its magnetization directions when reading data.

The SOT layer 510 comprises a heavy metal with strong spin orbital coupling, such as Ta, Pt, W, Hf, etc. The SOT layer 510 can comprise a topological insulator material, such as BiSe, WTe, YBiOPt, or BiSb. The SOT layer 510 may comprise BiSb in a (012) orientation. The SOT layer 510 may comprise undoped BiSb or doped BiSbX, where the dopant is less than about at. 10%, and where X is extracted from elements which don't readily interact with Bi, such as B, N, Al, Si, Ti, V, Cr, Fe, Ni, Cu, Ge, Y, Zr, Ru, Mo, Ag, Hf, Ta, W, or Ir, or in alloy combinations with one or more of aforementioned elements, like CuAg, CuNi, RuGe, etc. More generally, some of the listed dopants may be used with other topological insulator materials other than BiSb. The SOT layer 510 has a thickness 558 in the y-direction (e.g., a down-track direction) of about 5 nm to about 20, a height 560 in the x-direction (e.g., a stripe height) of about 100 nm to about 1 µm, and a width 562 (e.g., a cross-track direction) in the z-direction of less than about 100 nm.

Numerous materials may be utilized as seed layer 508 to provide a textured SOT layer 510 (012) growth using either textures (100) or as amorphous seed layers. One group of materials, Group A, includes body centered cubic (BCC) such as V, V$_3$Al, Mn$_3$Al, Nb, Mo, W, Ta, WTi50, NiAl, RhAl, or in alloy combinations of these materials with similar lattice parameters, or a BCC material used in combination with (100) textured layers such as Cr (heated at about 250° C. or larger), RuAl, IrAl, CoAl, B2 phases, NiAl—B2 phase, CrMo (Mo of about 20-50 at. %)-A2, or B2 phase, A2 CrX (X is about at. 10%, heated at about 250° C. or larger, and is selected from Ru, Ti, W, and Mo).

The Group A materials provide texturing for subsequent layers and may be referred to as a MgO (100) texturing layer stack. Generally speaking, depositing a high boron affinity elements or alloys such as alloys of tantalum, tungsten, or titanium and then depositing a magnetic layer containing boron, an amorphous magnetic layer material such as cobalt iron boron or cobalt boron is formed, but the boron would be pulled out leaving a magnetic cobalt iron or cobalt layer behind. On top of that layer, MgO could be formed with a (100) texture. Other manners to make MgO (100) can include depositing heated chromium or ruthenium aluminum grow in a textured fashion. MgO (100) texturing layer stacks can also be made by depositing thin MgO on a magnetic bilayer of Co, or CoFe on a magnetic boron alloy of CoFeB or CoB deposited on a thin high B gettering alloy seed layers of Hf, Ta, W, Ti, or alloys containing these elements.

Another group of materials, Group B, includes face centered cubic (FCC) oxide materials including FeO, CoO, NiO, ZrO, MgO, TiO, MgTiO, and MnO. Another group of materials, Group C, includes FCC nitrides and carbides including ScN, TiN, NbN, ZrN, HfN, TaN, VN, CrN, ScC, TiC, NbC, ZrC, HfC, TaC, WC, VC, and W$_{0.8}$Zr$_{0.2}$C. Group C materials can be deposited as amorphous to nanocrystalline thin films depending upon deposition conditions. Resistivities of Group C materials are >100-200 micro ohm-cm.

Another groups of materials, Group D, includes nonmagnetic Heusler materials including Fe$_2$VAl, Cr$_2$CoAl, CoTiSb, Mn$_2$VSi, V$_2$Al, [Mn$_{0.5}$Co$_{0.5}$]$_2$VAl, [Mn$_{0.75}$Co$_{0.25}$]$_2$VSi, CoMnNbAl, CoZrFeAl, and Ti$_2$MnAl. Another group of materials, Group E, are crystalline high polarization layers using magnetic alloys or Heusler alloys that have large spin polarizations and do not readily mix with a spin Hall layer including: Co$_2$MnSb, CoFeX, NiFeX, (where X is one or more of Si, Al, Mn, and Ge) CoFe, NiFe, Co$_2$MnGe, CoMnSb, NiMnSb, Co$_2$FeGe, Co$_2$MnSn, and Co$_2$MnFeGe. Another group of materials, Group F, includes amorphous nonmagnetic high resistive electrical shunt block layers that do not promote strong (012) BiSbX texture or growth. They include SiO$_2$, Al$_2$O$_3$, SiN, AlN, SiC, SiCrOx, NiX, FeX, and CoX, where X can be one or more of these elements including Fe, Co, Ni, Ta, Hf, W, Ir, Pt, Ti, Zr, N, Ru, Ge and/or B.

Another group of materials, Group G, includes any metal amorphous or ceramic amorphous material with the nearest neighbor x-ray diffraction peak in the 2.19 Å to 2.02 Å d-spacing range. Such materials include nonmagnetic and magnetic materials from Group A, D, or E which are laminated or alloyed with one or more elements of: Cu, Ag, Ge, Al, Mg, Si, Mn, Ni, Co, Mo, Zr, Y, Bi, Hf, Ta, W, Ir, Pt, Ti, or B. They form effectively nonmagnetic amorphous layers which produce amorphous materials or start with amorphous materials like a-Ge, and a-NiPX alloys (where X is one of Ru, Rh, Y, Zr, Mo, Hf, Ta, W, Re, Pt, or Ir), etc. Group G also may include amorphous/nanocrystalline alloys with a-Ge, a-NiP and one or more elements of: Cu, Ag, Ge, Al, Mg, Si, Mn, Ni, Co, Mo, Zr, Y, Bi, Hf, Ta, W, Ir, Pt, Ti, or B to promote a strong (012) BiSb texture.

Yet another group of materials, Group H, are high perpendicular magnetic anisotropy (PMA) materials that can be amorphous or crystalline materials. Amorphous rare-earth transition metals (RE-TM) that have high PMA like TbFeCo, TbFeB, Nd, Pr, Sm(Fe,Co)B or heavy metals like CoZrTaB can be used. This multilayer polycrystalline stacks of Co/Pt, Co/Pd, CoFe/Pt, Co/Tb, or CoFe/Tb ("/" denoting layer separation), or single layer PMA materials like CoPt, CoPtCr, CoFePt, and FePt with high Ku can be used with an amorphous high polarizing layer next to the spin Hall layer for (012) texture growth.

Figure 5C:
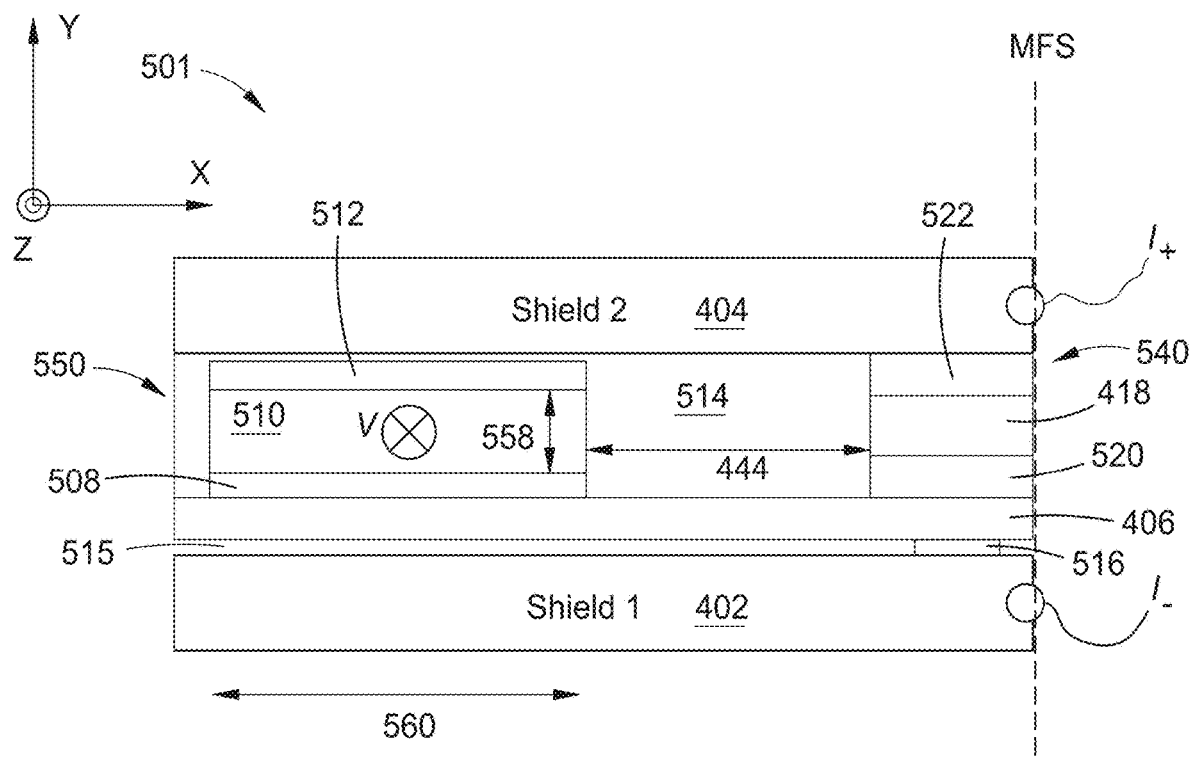
FIGS. 5C-5D illustrate a read head of a magnetic recording head, according to another embodiment.
Figure 5D:
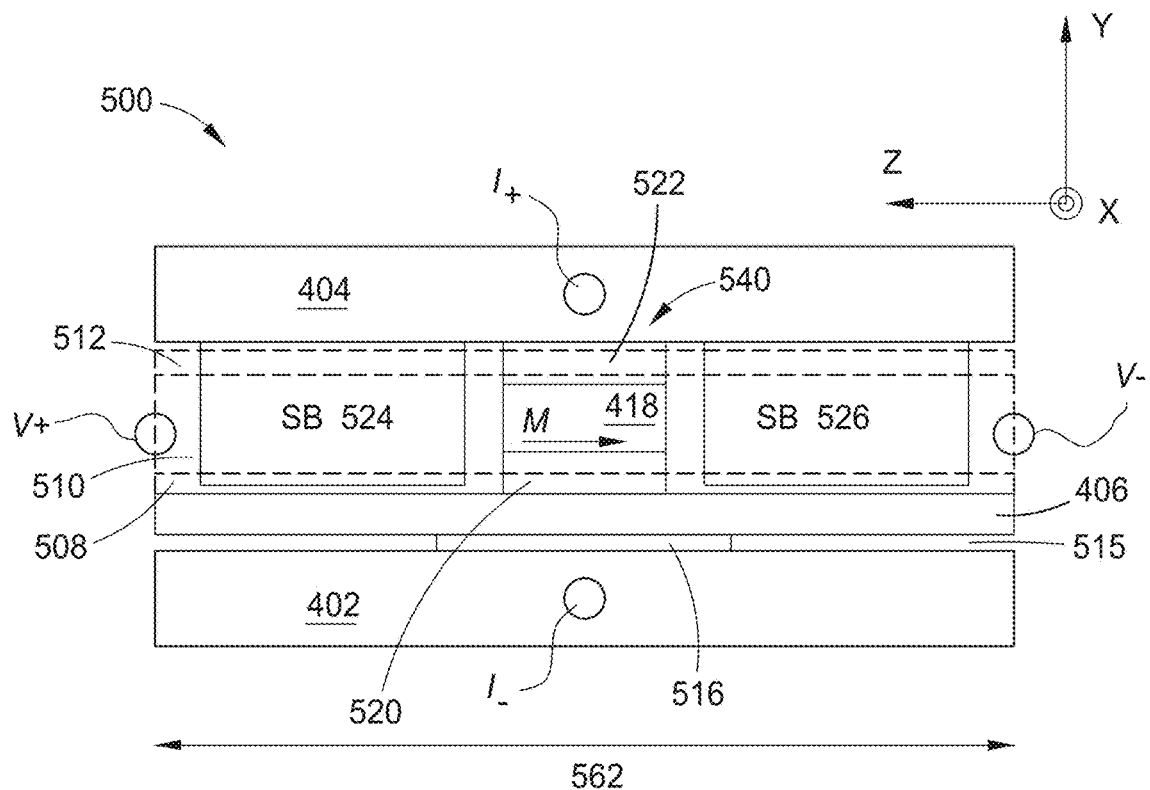

FIGS. 5C-5D illustrate a read head 501 of a magnetic recording head, according to one embodiment. FIG. 5C illustrates a cross-sectional view of the read head 501 and FIG. 5D illustrates a MFS view of the read head 501. In the read head 501, the non-magnetic layer 406 may be rectangular in shape, like shown and discussed above in FIGS. 4A-4D.

The read head 501 is similar to the read head 500 of FIGS. 5A-5B, however, the current and voltage leads are reversed. In the read head 501, a first current lead (I+) is connected to the second shield 404 and a second current lead (I−) is connected to the first shield 402 for spin injection. A first voltage lead (V−) and a second voltage lead (V+) are connected to the SOT layer 510 for read signal detection through the spin detector 550.

From FIG. 5C, the electrical current flows through the read sensor 540 and the non-magnetic layer 406 in the x-direction. During operation, when the current is applied to the read head 501, a spin accumulation will occur, and hence a spin current is generated from the free layer 418 which flows into and along the non-magnetic layer 406. The spin current travels across the read sensor 540 through the non-magnetic layer 406 to the spin detector 550, where the spin current flows out-of-plane (i.e., in the y-direction) through the SOT layer 510. The spin current flowing to the spin detector 550 enables an electrical signal generation across the SOT layer 510 along the z-direction when the free layer 418 rotates its magnetization directions when reading data.

Figure 6A:
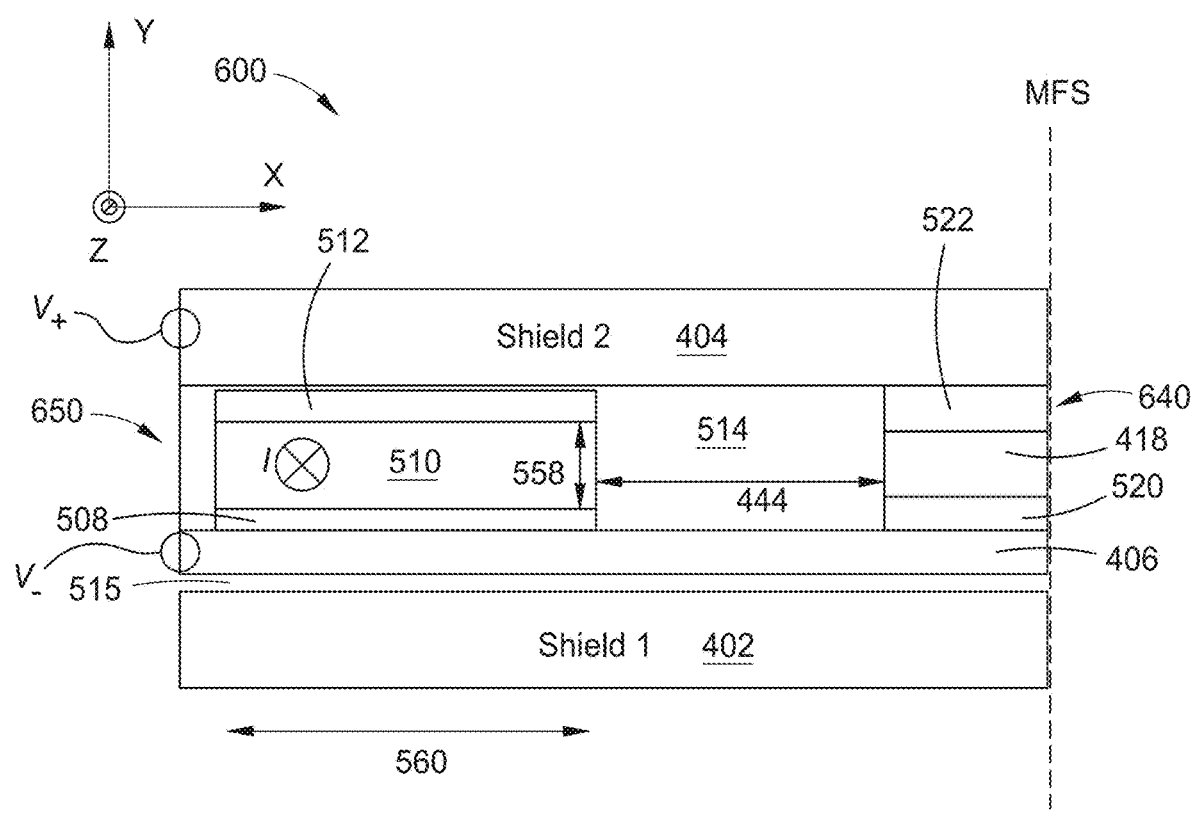
FIGS. 6A-6B illustrate a read head of a magnetic recording head, according to yet another embodiment.
Figure 6B:
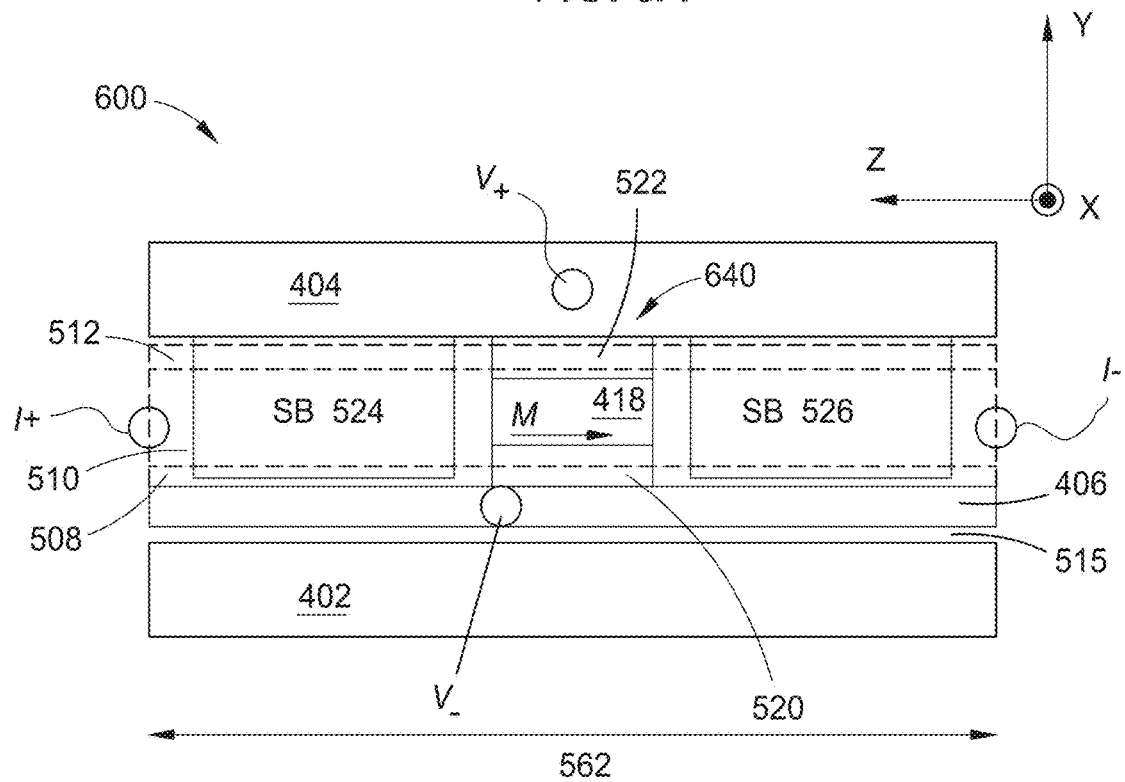

FIGS. 6A-6B illustrate a read head 600 of a magnetic recording head, according to another embodiment. FIG. 6A illustrates a cross-sectional view of the read head 600 and FIG. 6B illustrates a MFS view of the read head 600.

The read head 600 is similar to the read head 500 of FIGS. 5A-5B; however, the read head 600 does not comprise the notch 516. Rather, the dielectric layer 515 extends between the first shield 402 and the non-magnetic layer 406. Additionally, the first voltage lead (V−) is connected to the back of non-magnetic layer 406 instead of the first shield 402.

Figure 6C:
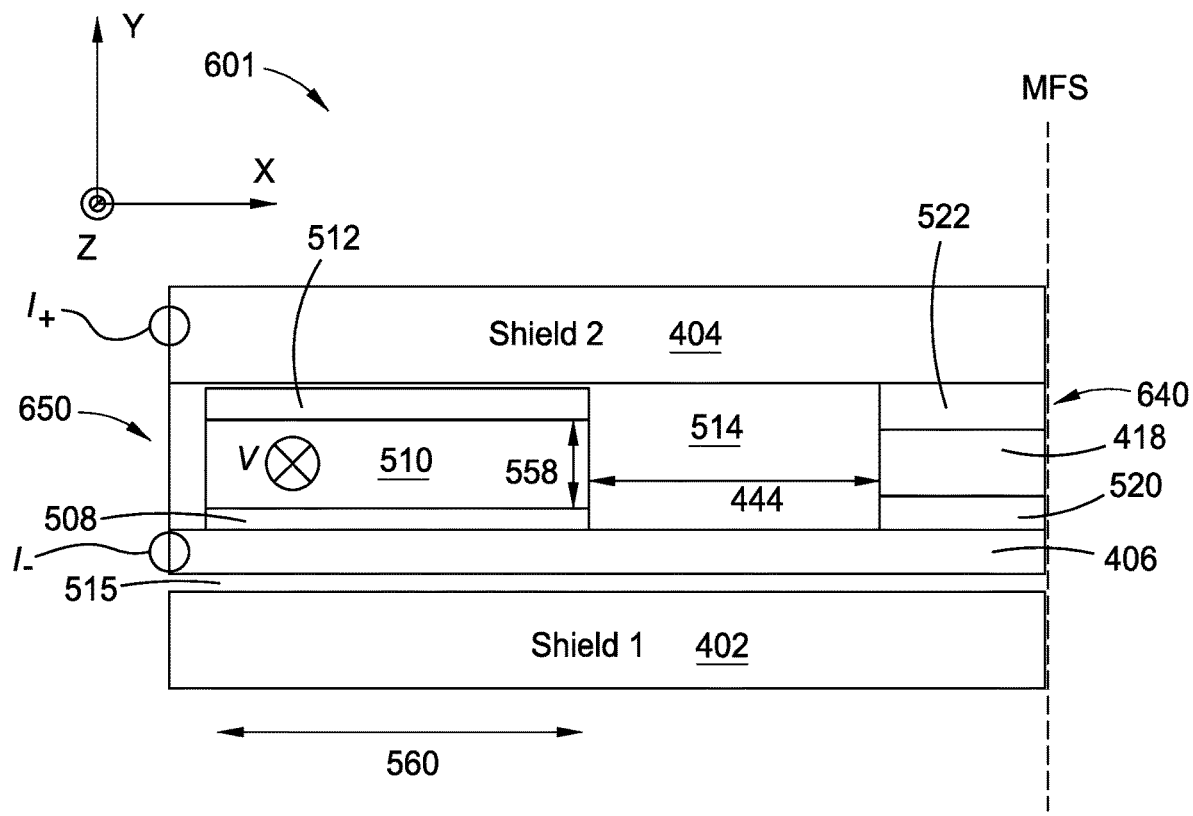
FIGS. 6C-6D illustrate a read head of a magnetic recording head, according to one embodiment.
Figure 6D:
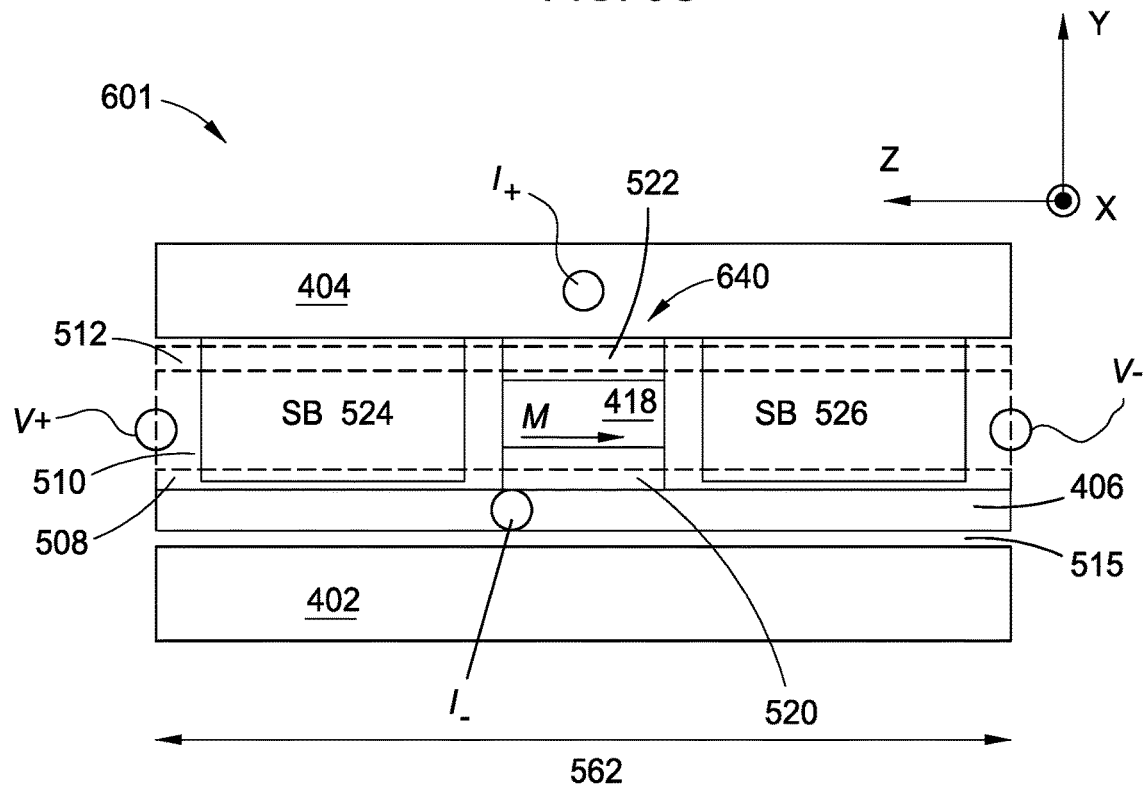

FIGS. 6C-6D illustrate a read head 601 of a magnetic recording head, according to one embodiment. FIG. 6C illustrates a cross-sectional view of the read head 601 and FIG. 6D illustrates a MFS view of the read head 601. In the read head 601, the non-magnetic layer 406 may be rectangular in shape, like shown and discussed above in FIGS. 4A-4D.

The read head 601 is similar to the read head 600 of FIGS. 6A-6B; however, the current and voltage leads are reversed. In the read head 601, a first current lead (I+) is connected to the second shield 404 and a second current lead (I−) is connected to the non-magnetic layer 406 for spin injection. A first voltage lead (V−) and a second voltage lead (V+) are connected to the SOT layer 510 for read signal detection through the spin detector 650.

During operation, when the current is applied to the read head 601, a spin accumulation will occur, and hence a spin current is generated and flows from the sensor 640 into the non-magnetic layer 406. The spin current travels across the read sensor 640 through the non-magnetic layer 406 to the spin detector 650, where the spin current flows out-of-plane (i.e., in the y-direction) through the SOT layer 510. The spin current flowing to the spin detector 650 enables an electrical signal generation across the SOT layer 510 due to the inverse spin Hall effect when the free layer 418 rotates its magnetization directions when reading data.

Figure 7A:
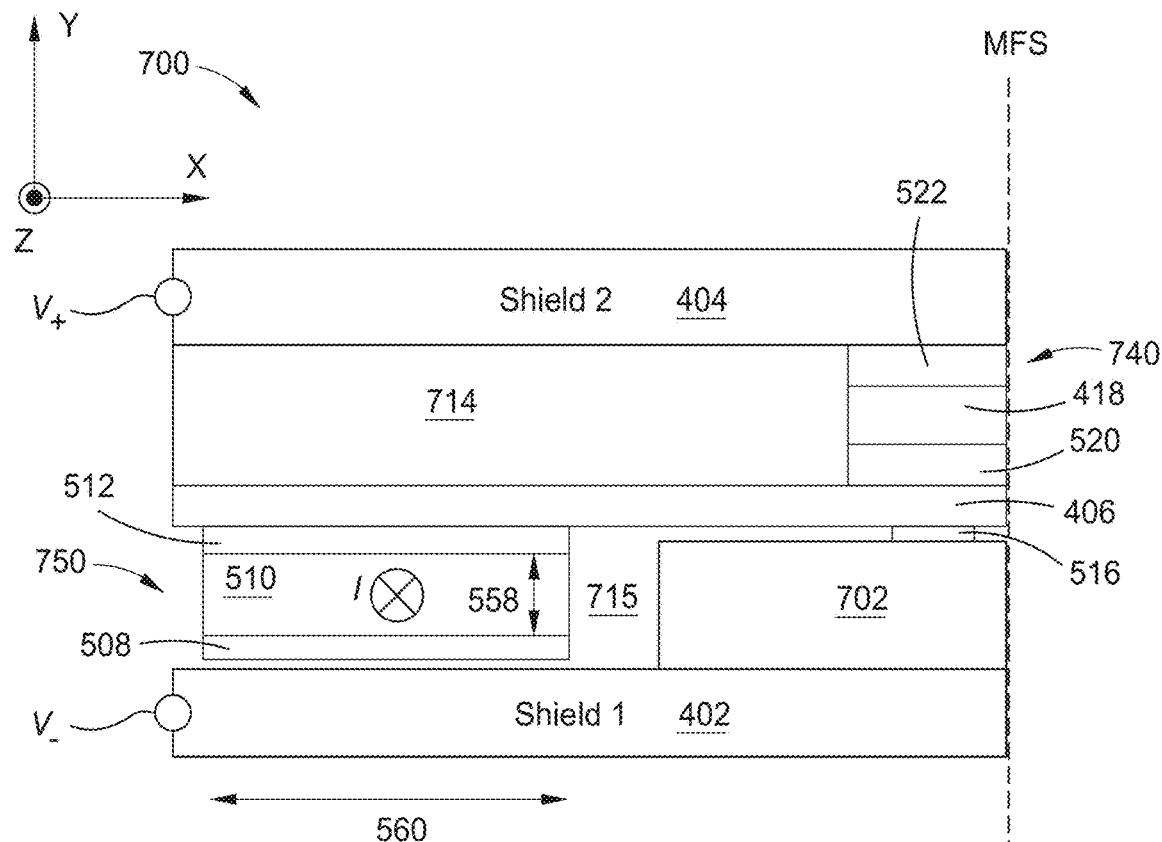
FIGS. 7A-7B illustrate a read head of a magnetic recording head, according to another embodiment.
Figure 7B:
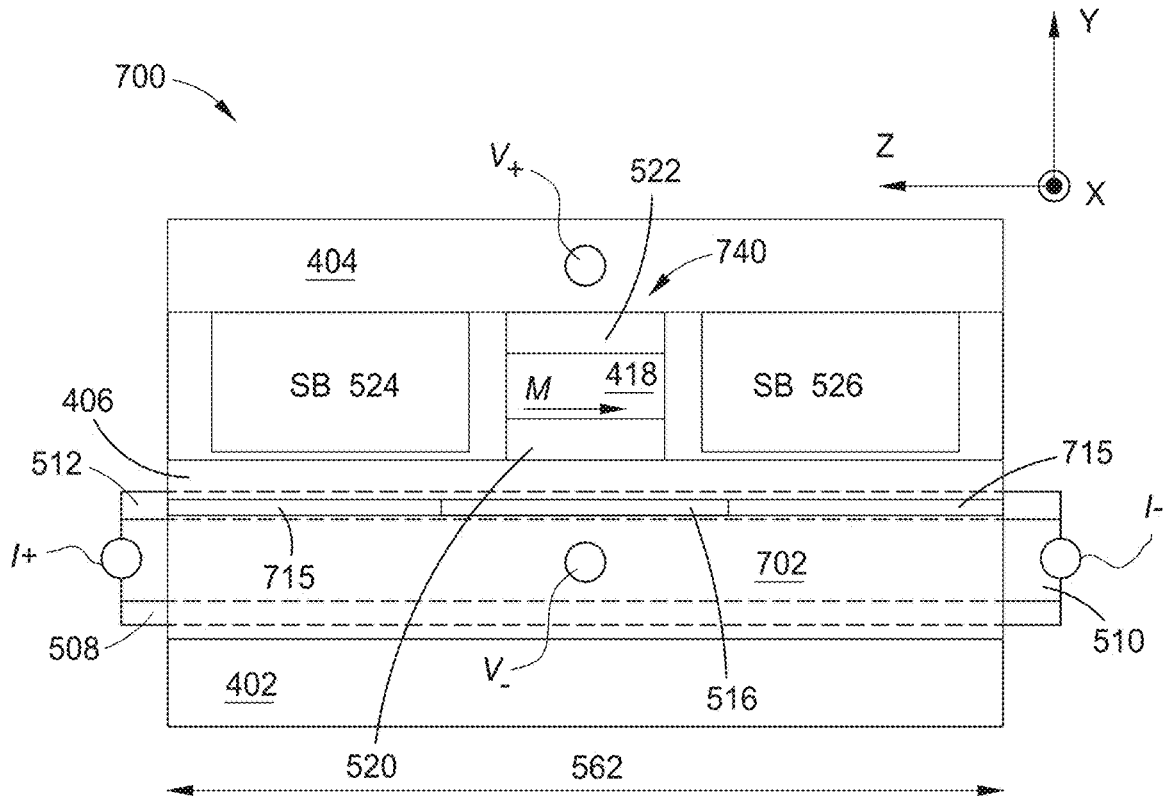

FIGS. 7A-7B illustrate a read head 700 of a magnetic recording head, according to yet another embodiment. FIG. 7A illustrates a cross-sectional view of the read head 700 and FIG. 7B illustrates a MFS view of the read head 700. The read head 700 is similar to the read head 500 of FIGS. 5A-5B, however, the sensor 740 and the spin generator 750 of the read head 700 are unaligned in both the x-direction and the y-direction.

In the read head 700, the spin generator 750 is disposed over the first shield 402. The spin generator 750 is recessed from the MFS by a shield notch 702. The shield notch 702 may be considered a part of the first shield 402. The shield notch 702 may comprise the same material as the first shield 402 and/or the notch 516. A first insulating layer 715 is disposed between the shield notch 702 and the spin generator 750. The first insulating layer 715 may extend between the first shield 402 and the seed layer 508 as well. The notch 516 is disposed on the shield notch 702. The non-magnetic layer 406 is disposed over the notch 516, the spin generator 750, and the first insulating layer 715. The sensor 740 is disposed on the non-magnetic layer 406 at the MFS. A second insulating layer 714 is disposed on the non-magnetic layer 406 behind the sensor 740. Portions of the first and second insulating layers 715, 714 may be exposed at the MFS, like shown in FIG. 7B, and may each individually comprise the same materials as the insulating layer 514. The first SB side shield 524 and the second SB side shield 526 are disposed adjacent to the sensor 740 at the MFS.

A negative voltage lead (V−) is connected to the first shield 402, and a positive voltage lead (V+) is connected to the second shield 404. A negative current lead (I−) and a positive current lead (I+) are connected to the SOT layer 510 for spin injection. The electrical current flows through the SOT layer 510 into the page (with respect to FIG. 5A), or the z-direction. During operation, when this in-plane (in plane of the SOT layer 510) current is applied to the read head 700, a spin accumulation will occur, and hence a spin current is generated in the non-magnetic layer 406 due to a spin Hall effect. This spin current travels from the spin generator 750 down through the non-magnetic layer 406 to the read sensor 740. This spin current flowing to the read sensor 740 enables an electrical signal generation across the sensor 740 when the free layer 418 rotates its magnetization directions when reading data.

Figure 7C:
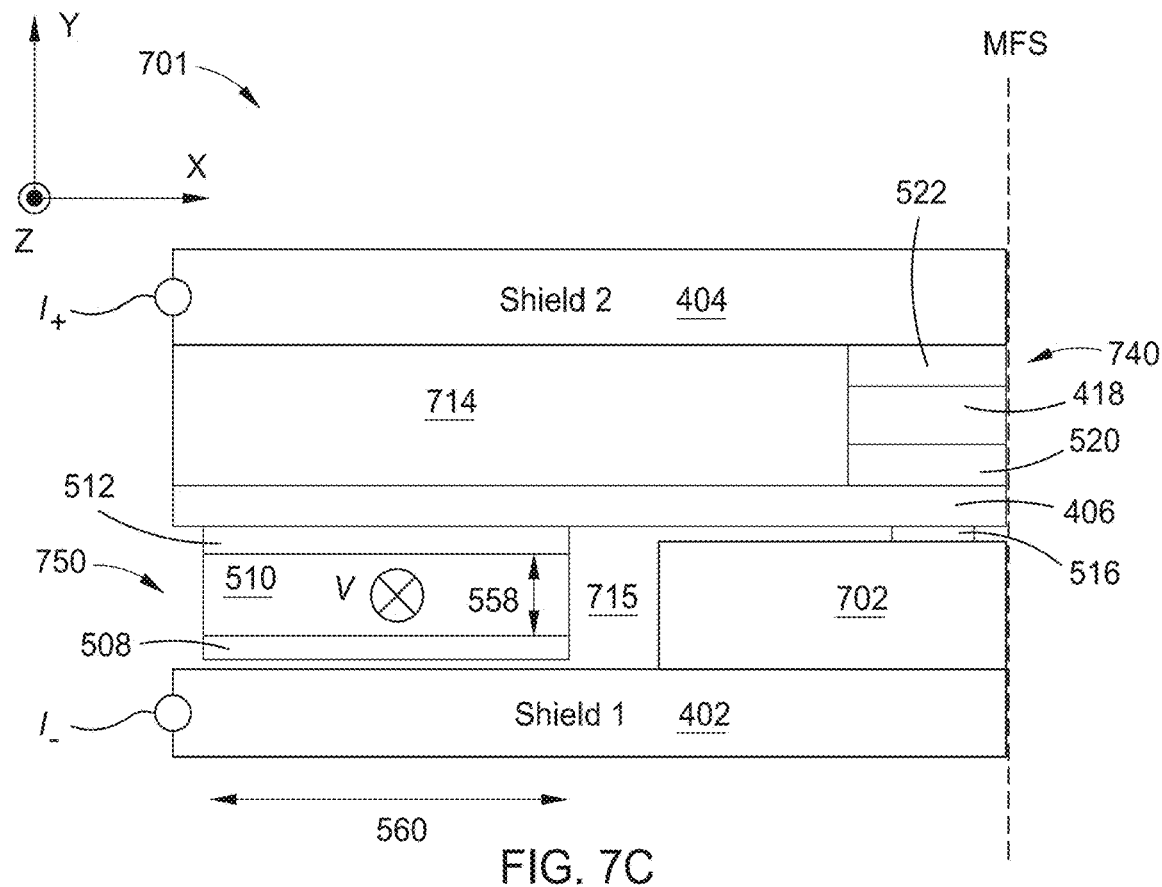
FIGS. 7C-7D illustrate a read head of a magnetic recording head, according to yet another embodiment.
Figure 7D:
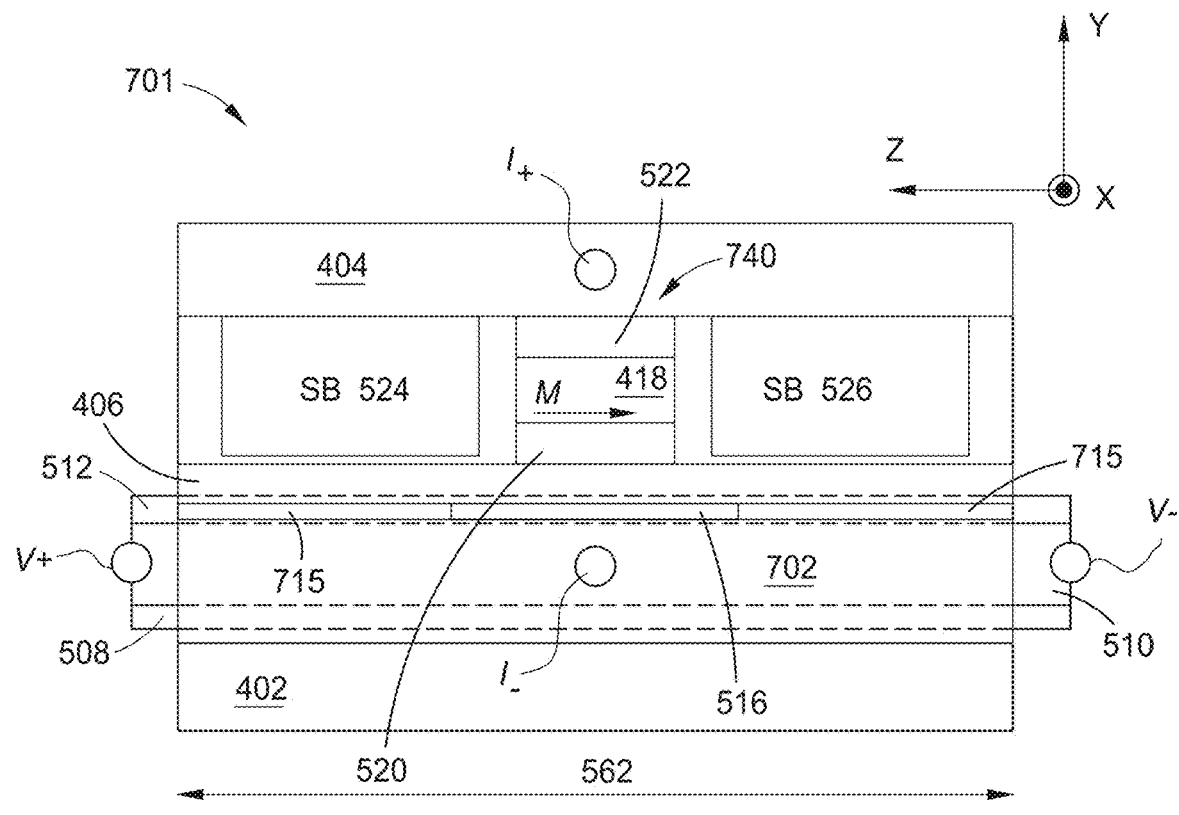

FIGS. 7C-7D illustrate a read head 701 of a magnetic recording head, according to one embodiment. FIG. 7C illustrates a cross-sectional view of the read head 701 and FIG. 7D illustrates a MFS view of the read head 701. In the read head 701, the non-magnetic layer 406 may be rectangular in shape, like shown and discussed above in FIGS. 4A-4D.

The read head 701 is similar to the read head 700 of FIGS. 7A-7B, however, the current and voltage leads are reversed. In the read head 701, a first current lead (I+) is connected to the second shield 404 and a second current lead (I−) is connected to the first shield 402 for spin injection. A first voltage lead (V−) and a second voltage lead (V+) are connected to the SOT layer 510 for read signal detection through the spin detector 750.

During operation, when the current is applied to the read head 701, a spin accumulation will occur, and hence a spin current is generated from the sensor 740 and flows into the non-magnetic layer 406. The spin current travels across the read sensor 740 through the non-magnetic layer 406 to the spin detector 750, where the spin current flows out-of-plane (i.e., in the y-direction) through the SOT layer 510. The spin current flowing to the spin detector 750 enables an electrical signal generation across the SOT layer 510 due to the inverse spin Hall effect when the free layer 418 rotates its magnetization directions when reading data.

Figure 8A:
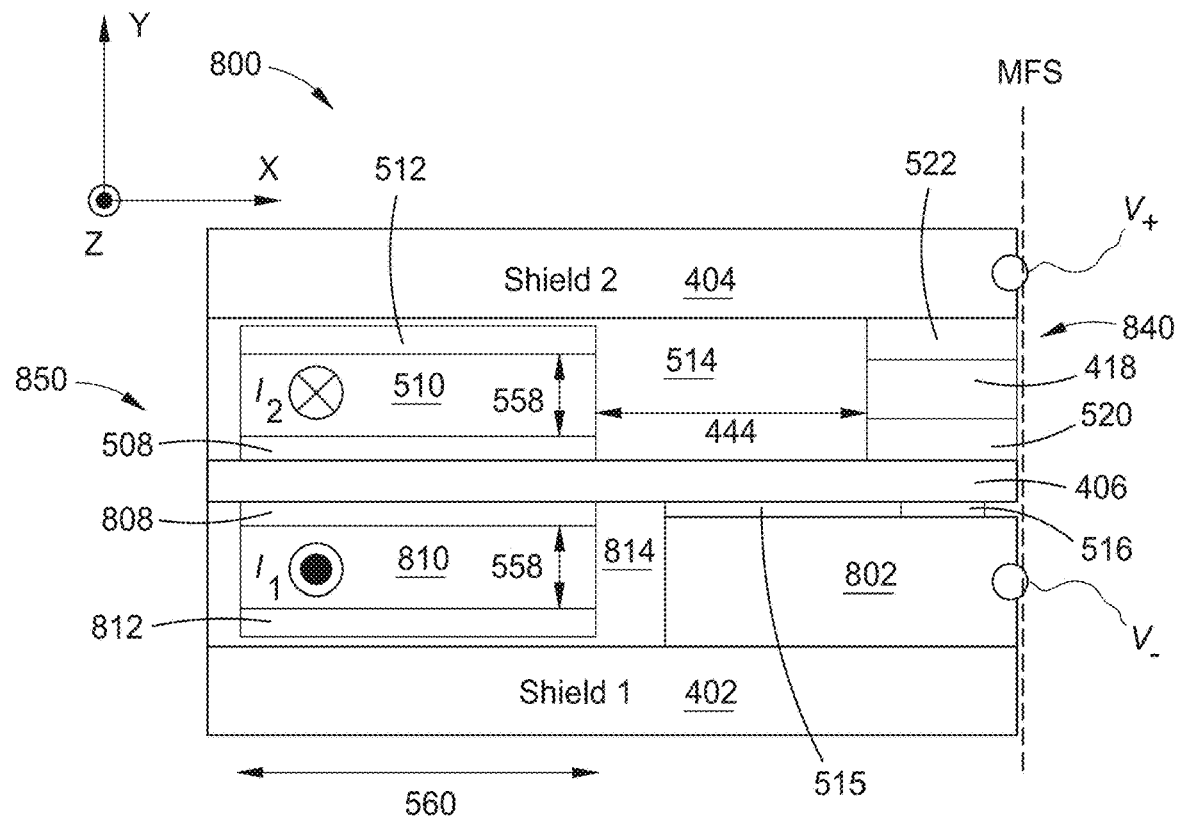
FIGS. 8A-8B illustrate a read head of a magnetic recording head, according to another embodiment.
Figure 8B:
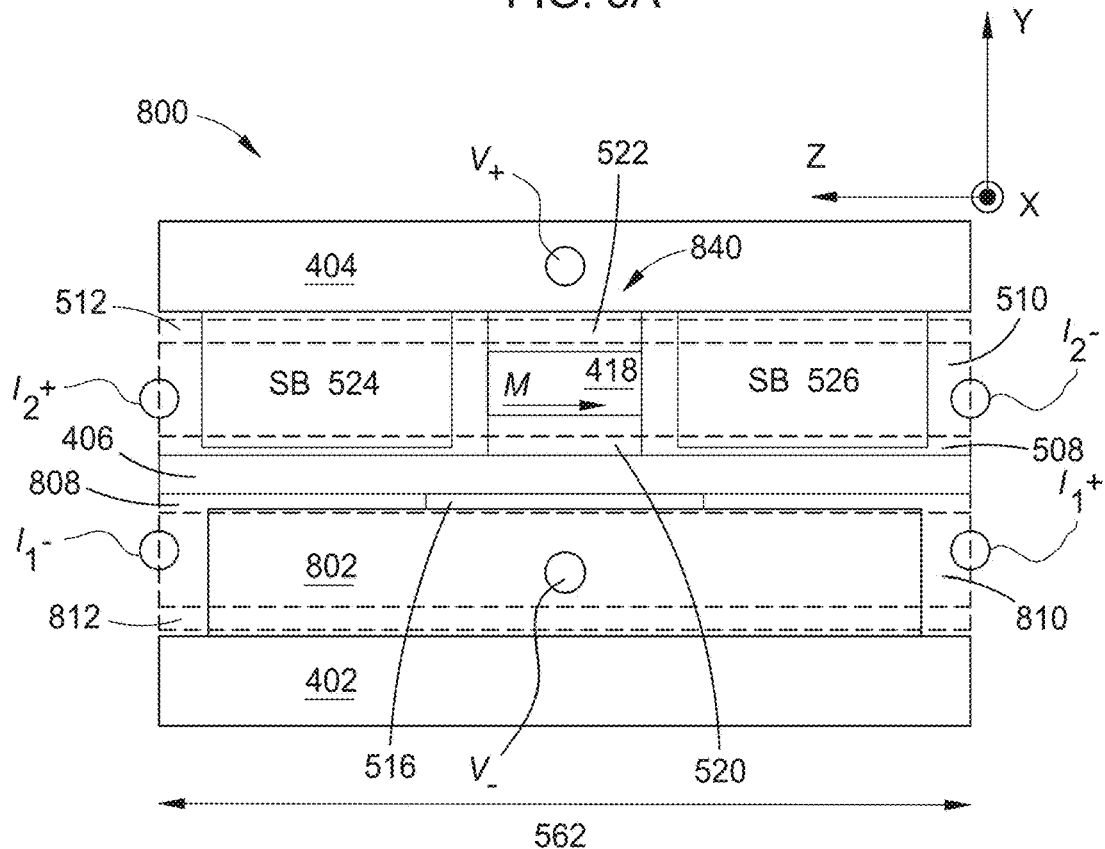

FIGS. 8A-8B illustrate a read head 800 of a magnetic recording head, according to another embodiment. FIG. 8A illustrates a cross-sectional view of the read head 800 and FIG. 8B illustrates a MFS view of the read head 800. The read head 800 is similar to the read head 500 of FIGS. 5A-5B; however, the read head 800 comprises a second seed layer 808, a second SOT layer 810, and a second cap layer 812.

In the read head 800, the first shield 402 further comprises a shield notch 802 disposed at the MFS between the first shield 402 and the notch 516. The shield notch 802 may comprise the same material as the first shield 402. A second cap layer 812 is disposed over the first shield 402 behind the shield notch 802, a second SOT layer 810 is disposed on the second cap layer 812, and a second seed layer 808 is disposed on the second SOT layer 810. The second cap layer 812 may comprise the same material as the cap layer 512. The non-magnetic layer 406 is disposed on the second seed layer 808. A second insulating layer 814 is disposed between the shield notch 802 and the second cap layer 812, the second SOT layer 810, and the second seed layer 808. The second insulating layer 814 may be disposed between the first shield 402 and the second cap layer 812, as well as behind the second cap layer 812, the second SOT layer 810, and the second seed layer 808, similar to the insulating layer 514. The second insulating layer 814 may comprise the same material as the first insulating layer 514. The second SOT layer 810 has the same dimensions as the first SOT layer 510 (i.e., the same dimensions as the SOT layer 510 of FIGS. 5A-7B).

The first seed layer 508 is disposed on the non-magnetic layer 406, a first SOT layer 510 is disposed on the first seed layer 508, and a first cap layer 512 is disposed on the first SOT layer 510. The second shield 404 is disposed over the first cap layer 512. The first cap layer 512 may comprise the same material as the second cap layer 812, the first SOT layer 510 may comprise the same material as the second SOT layer 810, and the first seed layer 508 may comprise the same material as the second seed layer 808. The first cap layer 512, the first SOT layer 510, the first seed layer 508, a portion of the non-magnetic layer 406 disposed in contact with the first seed layer 508, the second seed layer 808, the second SOT layer 810, and the second cap layer 812 collectively form the spin generator 850.

The first signal voltage lead (V−) is connected to the shield notch 802, and the second signal voltage lead (V+) is connected to the second shield 404. A first negative current lead (I$_{1-}$) and a first positive current lead (I$_{1+}$) are connected to the second SOT layer 810, and a second negative current lead (I$_{2-}$) and a second positive current lead (I$_{2+}$) are connected to the first SOT layer 510. The first negative current lead (I$_{1-}$) is disposed adjacent to the second positive current lead (I$_{2+}$), and the first positive current lead (I$_{1+}$) is disposed adjacent to the second negative current lead (I$_{2-}$). During operating, a first electrical current (I$_1$) flows through the second SOT layer 810 out of the page (with respect to FIG. 8A), or in the z-direction, and a second electrical current (I$_2$) flows through the first SOT layer 510 into the page (with respect to FIG. 8A), or in the −z-direction. By including two SOT layers on both sides of the non-magnetic 406, the amount of spin current generated from the spin generator 850, and hence the spin flow into the non-magnetic layer 406, is doubled.

Figure 8C:
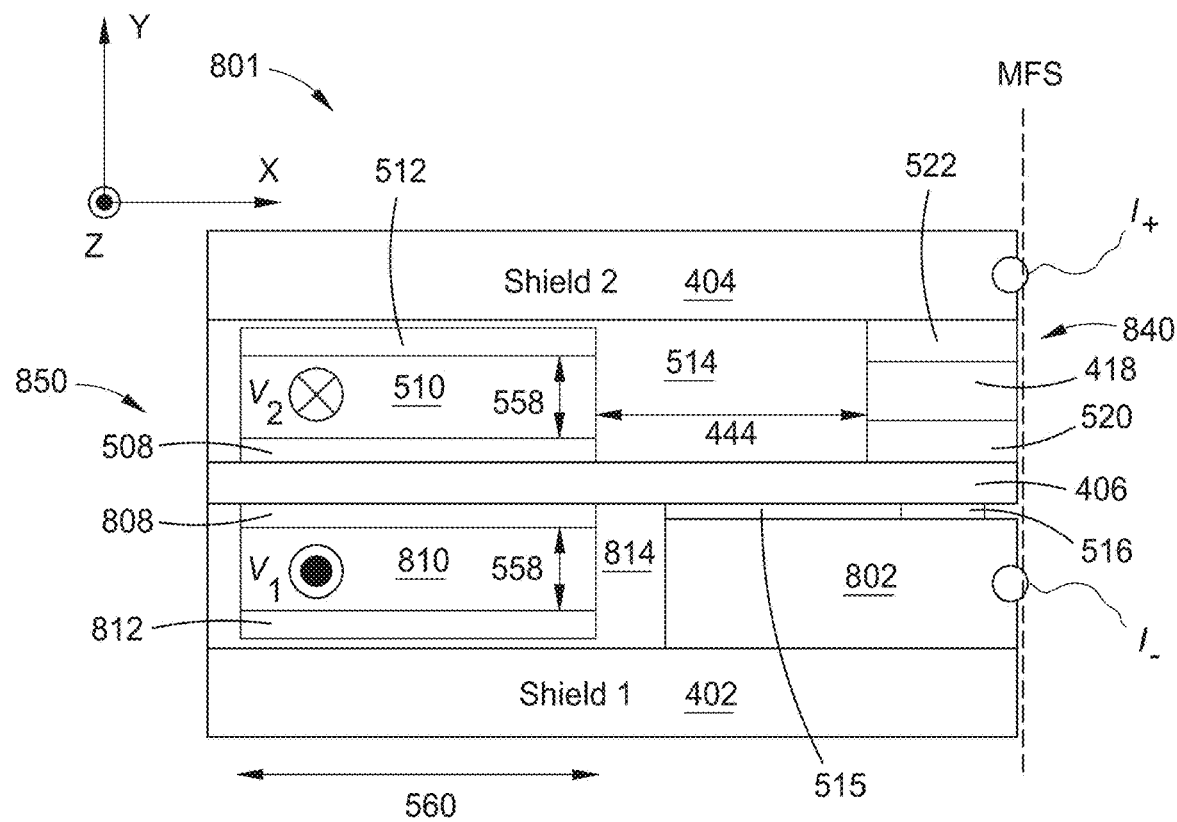
FIGS. 8C-8D illustrate a read head of a magnetic recording head, according to one embodiment.
Figure 8D:
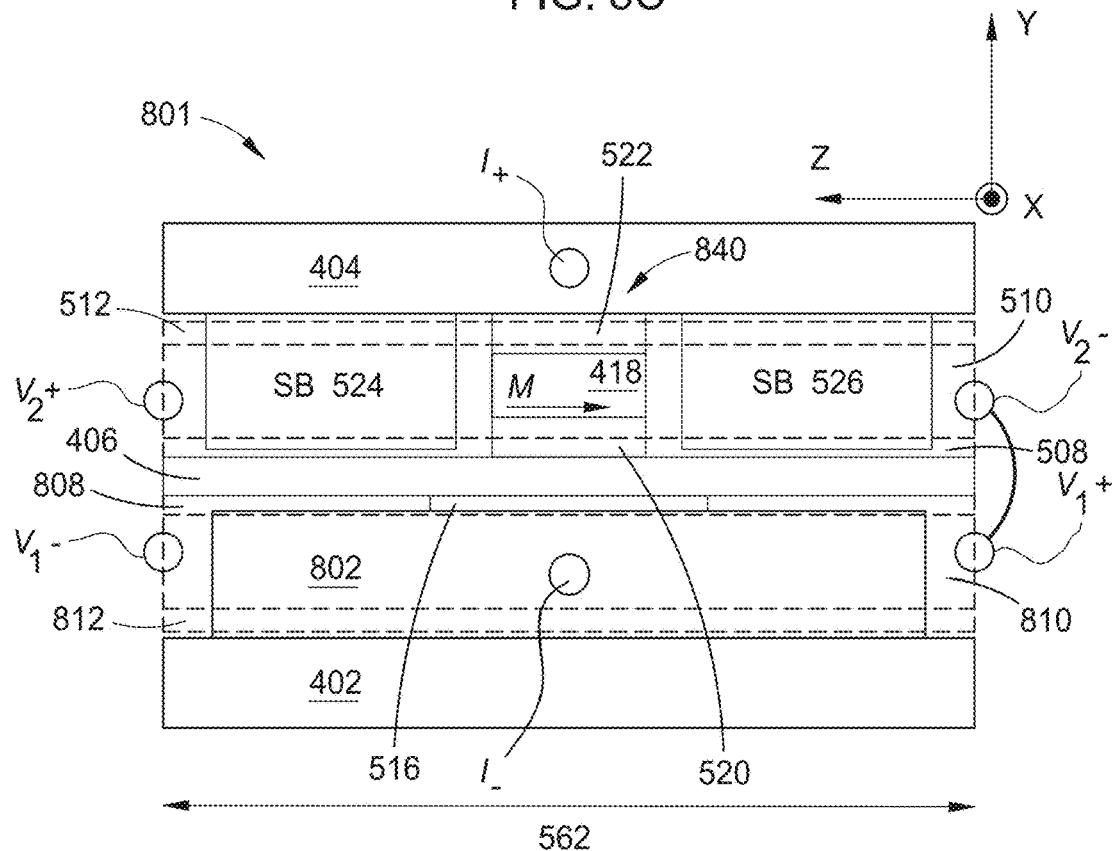

FIGS. 8C-8D illustrate a read head 801 of a magnetic recording head, according to one embodiment. FIG. 8C illustrates a cross-sectional view of the read head 801 and FIG. 8D illustrates a MFS view of the read head 801. In the read head 801, the non-magnetic layer 406 may be rectangular in shape, like shown and discussed above in FIGS. 4A-4D.

The read head 801 is similar to the read head 800 of FIGS. 8A-8B, however, the current and voltage leads are reversed. In the read head 801, a first input current lead (I+) is connected to the second shield 404 and a second input current lead (I−) is connected to the shield notch 802 for spin injection. A first negative voltage lead (V$_1$−) and a first positive voltage lead (V$_1$+) are connected to the second SOT layer 810, and a second negative voltage lead (V$_2$−) and a second positive voltage lead (V$_2$+) are connected to the first SOT layer 510 for read signal detection through the spin detector 850. The first positive voltage lead (V$_1$+) is disposed adjacent to the second negative voltage lead (V$_2$−), and the first negative voltage lead (V$_1$−) is disposed adjacent to the second positive voltage lead (V$_2$+). The first positive voltage lead (V$_1$+) and the second negative voltage lead (V$_2$−) are connected together such that the final signal read out occurs at the first negative voltage lead (V$_1$−) and the second positive voltage lead (V$_2$+).

During operation, when the input current is applied to the read head 801, a spin accumulation will occur, and hence a spin current is generated from the sensor 840 and flows into the non-magnetic layer 406. The spin current travels across the read sensor 840 through the non-magnetic layer 406 to the spin detector 850. The spin current then splits such that half of the spin current flows down through the second SOT layer 810 and half of the spin current flows up through the first SOT layer 510 (as shown by the arrows labeled Is), where the spin current flows out-of-plane (i.e., in the y-direction) through each SOT layer 510, 810. The vertical spin current flowing into the SOT layers 510, 810 enables an electrical signal generation across the SOT layers 510, 810 via the inverse spin Hall effect when the free layer 418 rotates its magnetization directions when reading data. Because the two split spin currents flow opposite in the y-direction, the generated signal polarity will be opposite as well, as shown by the voltage leads V$_2$+N$_2$− and V$_1$+N$_1$− in FIG. 8D. The first positive voltage lead (V$_1$+) and the second negative voltage lead (V$_2$−) are connected together such that the final signal read out occurs at the first negative voltage lead (V$_1$−) and the second positive voltage lead (V$_2$+).

Figure 9A:
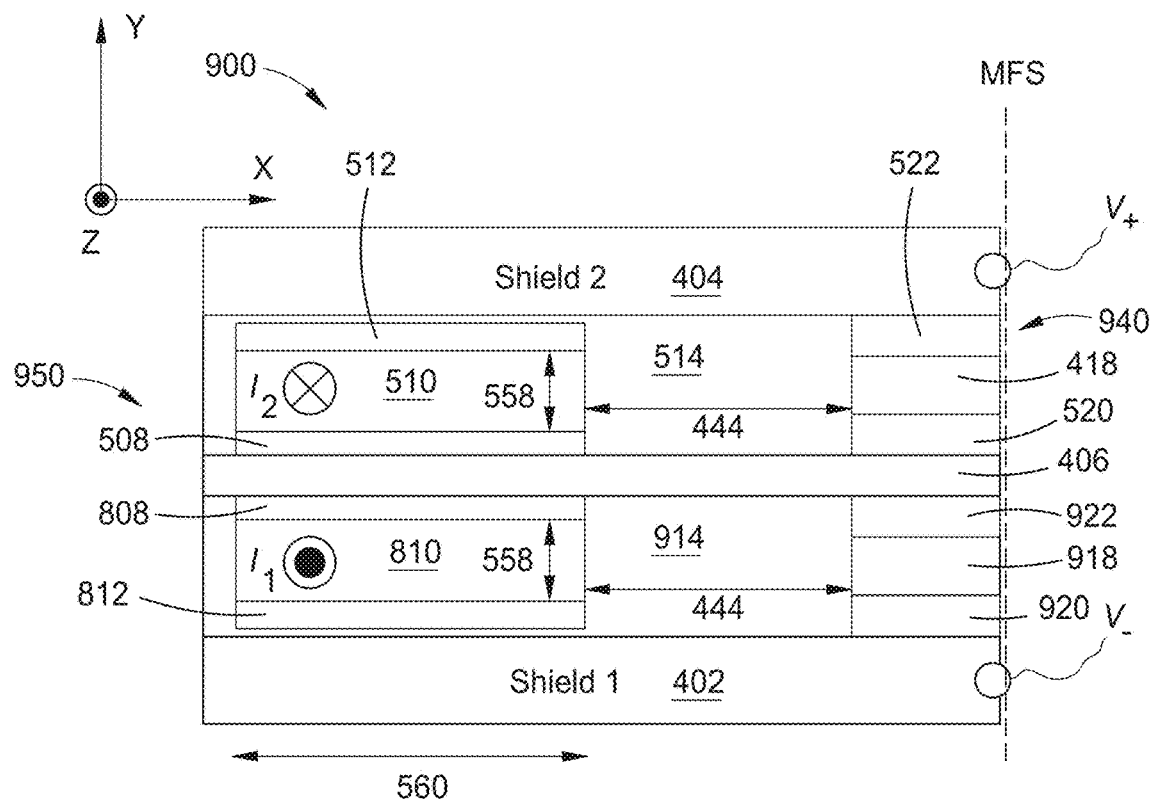
FIGS. 9A-9B illustrate a read head of a magnetic recording head, according to yet another embodiment.
Figure 9B:
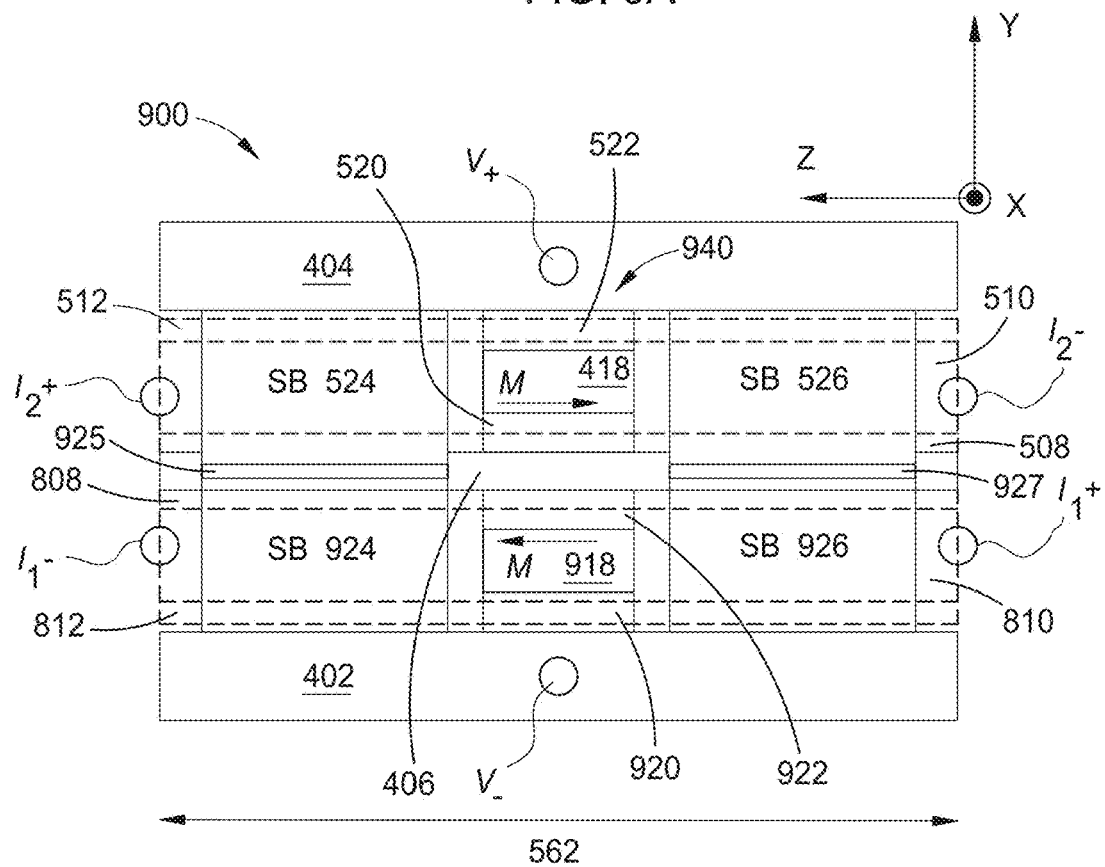

FIGS. 9A-9B illustrate a read head 900 of a magnetic recording head, according to yet another embodiment. FIG. 9A illustrates a cross-sectional view of the read head 900 and FIG. 9B illustrates a MFS view of the read head 900. The read head 900 is similar to the read head 800 of FIGS. 8A-8B, however, rather than comprising the shield notch 802, the sensor 940 comprises a first free layer 418 and a second free layer 918 for a dual free layer (DFL) configuration. Furthermore, similar to the read heads 600 and 700 of FIGS. 6A-7B, the read head 900 does not comprise the notch 516.

In the read head 900, the sensor 940 comprises a seed layer 920 disposed over the first shield 402, a second free layer 918 disposed on the seed layer 920, a second tunnel barrier layer 922 disposed on the second free layer 918, the first tunnel barrier layer 520 disposed on the non-magnetic layer 406, a first free layer 418 disposed on the first tunnel barrier layer 520, and the cap layer 522 disposed on the first free layer 418. A portion of the non-magnetic layer 406 disposed in contact with the second tunnel barrier layer 922 and the first tunnel barrier layer 520 may be considered a part of the sensor 940 as well. The second free layer 918 may comprise the same material as the first free layer 418.

A second insulating layer 914 is disposed between the sensor 940 and the spin generator 950 below the non-magnetic layer 406. The second insulating layer 914 may be disposed between the second cap layer 812 and the first shield 402, as well as behind the second cap layer 812, the second SOT layer 810, and the second seed layer 808. The second insulating layer 914 may comprise the same material as the insulating layer 514. The first and second tunnel barrier layers 520, 922 may each comprise the same material. The seed layer 920 and the cap layer 522 may comprise the same material.

The first and second SB side shields 524, 526 are disposed adjacent to the first free layer 418 at the MFS. A third SB side shield 924 and a fourth SB side shield 926 are disposed adjacent to the second free layer 918 at the MFS. The first, second, third, and fourth SB side shields 524, 526, 924, 926 may all comprise the same material. The first SB side shield 524 is disposed over the third SB side shield 924, and the second SB side shield 526 is disposed over the fourth SB side shield 926. A first Ru layer 925 is disposed between the first SB side shield 524 and the third SB side shield 924, and a second Ru layer 927 is disposed between the second SB side shield 526 and the fourth SB side shield 926. The first Ru layer 925 is adjusted such that it allows for antiferromagnetic coupling of the first and third SB side shields 524, 924, and the second Ru layer 927 is adjusted such that it allows for antiferromagnetic coupling of the second and fourth SB side shields 526, 926. The magnetization of the third and fourth SB side shields 924, 926 to that of the first and second SB side shields 524, 526 is opposite such that first free layer 418 and the second free layer 918 have an opposite magnetization orientation in the cross-track direction (along the z-direction).

The first signal voltage lead (V−) is connected to the first shield 402, and the second signal voltage lead (V+) is connected to the second shield 404. A first negative current lead ($I_{1-}$) and a first positive current lead ($I_{1+}$) are connected to the second SOT layer 810, and a second negative current lead ($I_{2-}$) and a second positive current lead ($I_{2+}$) are connected to the first SOT layer 510. The first negative current lead ($I_{1-}$) is disposed adjacent to the second positive current lead ($I_{2+}$), and the first positive current lead ($I_{1+}$) is disposed adjacent to the second negative current lead ($I_{2-}$).

During operating, a first electrical current ($I_1$) flows through the second SOT layer 810 out of the page (with respect to FIG. 9A), or in the z-direction, and a second electrical current ($I_2$) flows through the first SOT layer 510 into the page (with respect to FIG. 9A), or in the −z-direction. A magnetization direction of the second free layer 918 is in the z-direction, and a magnetization direction of the first free layer 418 is in the −z-direction. As such, the first free layer 418 and the second free layer 918 have anti-parallel magnetization directions. By including two SOT layers in the spin generator 950, the induced spin current is doubled. The signal coming from each free layer 418, 918 is decided by the relative angle between the free layer magnetization to spin polarization (P) in the non-magnetic layer 406. By including two free layers 418, 918 in the sensor 940, the signal produced is doubled.

By including at least one SOT layer in a read sensor recessed from the MFS, the read heads discussed above are able to achieve a higher spin current injection/polarization, such that by making effective polarization significantly larger than 1. Furthermore, due to the trapezoidal shape of the non-magnetic transport layer, the spin current is more concentrated and the signal output is increased at the read sensor disposed at the MFS.

In one embodiment, a read head comprises a first shield, a second shield, a non-magnetic layer disposed between the first shield and the second shield, a sensor disposed between the non-magnetic layer and the second shield at a media facing surface (MFS), the sensor comprising a free layer, and a spin generator disposed adjacent to the non-magnetic layer and recessed from the MFS by a first distance, the spin generator being spaced from the sensor, wherein the spin generator comprises a spin orbit torque (SOT) layer and wherein the first distance is greater than a height of the free layer as measured from the MFS.

The spin generator is disposed between the non-magnetic layer and the second shield. The read head further comprises a negative voltage lead connected to the first shield, a positive voltage lead connected to the second shield, a positive current lead connected to the SOT layer, and a negative current lead connected to the SOT layer, wherein the positive and negative current leads are aligned to provide a current path through the SOT layer in a cross-track direction. The read head further comprises a negative voltage lead connected to the non-magnetic layer, a positive voltage lead connected to the second shield, a positive current lead connected to the SOT layer, and a negative current lead connected to the SOT layer, wherein the positive and negative current leads are aligned to provide a current path through the SOT layer in a cross-track direction.

The read head further comprises a negative current lead connected to the first shield, a positive current lead connected to the second shield, a positive voltage lead connected to the SOT layer, and a negative voltage lead connected to the SOT layer. The read head further comprises a negative current lead connected to the non-magnetic layer, a positive current lead connected to the second shield, a positive voltage lead connected to the SOT layer, and a negative voltage lead connected to the SOT layer. The SOT layer comprises a topological insulating material. The topological insulator material is BiSb. The non-magnetic layer comprises a first portion and a second portion, the first portion have a greater width than the second portion, wherein the first portion is disposed adjacent to the spin generator and the second portion is disposed adjacent to the sensor. The spin generator further comprises a seed layer disposed on the non-magnetic layer and a cap layer disposed on the SOT layer, and wherein the sensor further comprises a first tunnel barrier layer disposed on the non-magnetic layer and a cap layer disposed on the free layer. The spin generator is disposed between the non-magnetic layer and the first shield. A magnetic recording head comprises the read head. A magnetic recording device comprises the magnetic recording head.

In another embodiment, a magnetic recording device comprises a read head, the read head comprising: a first shield, the first shield comprising a shield notch, a second shield, a non-magnetic layer disposed between the shield notch and the second shield, a sensor disposed between the non-magnetic layer and the second shield at a media facing surface (MFS), the sensor comprising a free layer, and a spin generator recessed from the MFS, the spin generator being spaced from the sensor, wherein the spin generator comprises: a first spin orbit torque (SOT) layer disposed between the first shield and the non-magnetic layer, and a second SOT layer disposed between the non-magnetic layer and the second shield.

The first SOT layer is disposed adjacent to the shield notch, and wherein the second SOT layer is disposed adjacent to the free layer. The non-magnetic layer extends between the sensor and the spin generator, and wherein the non-magnetic layer has a height of about 100 nm to about 300 nm. The read head further comprises: a first negative current lead connected to the first SOT layer, a first positive current lead connected to the first SOT layer, a second positive current lead connected to the second SOT layer, the second positive current lead being disposed adjacent to the first negative current lead, and a second negative current lead connected to the second SOT layer, the second negative current lead being disposed adjacent to the first positive current lead.

The read head further comprises: a first negative voltage lead connected to the first SOT layer, a first positive voltage lead connected to the first SOT layer, a second positive voltage lead connected to the second SOT layer, the second positive voltage lead being disposed adjacent to the first negative voltage lead, and a second negative voltage lead connected to the second SOT layer, the second negative voltage lead being disposed adjacent to the first positive voltage lead. The read head further comprises a non-magnetic notch disposed between the shield notch and the non-magnetic layer. The spin generator is disposed between the first shield and the second shield. A magnetic recording device comprises the magnetic recording head.

In yet another embodiment, a magnetic recording device comprises a read head, the read head comprising: a first shield, a second shield, a non-magnetic layer disposed between the first shield and the second shield, a sensor disposed between the first shield and the second shield at a media facing surface (MFS), the sensor comprising a first free layer and a second free layer, and a spin generator recessed from the MFS, the spin generator being spaced from the sensor, wherein the spin generator comprises: a first spin orbit torque (SOT) layer disposed between the first shield and the non-magnetic layer, and a second SOT layer disposed between the non-magnetic layer and the second shield.

The read head further comprises: a first negative current lead connected to the first SOT layer, a first positive current lead connected to the first SOT layer, a second positive current lead connected to the second SOT layer, the second positive current lead being disposed adjacent to the first negative current lead, and a second negative current lead connected to the second SOT layer, the second negative current lead being disposed adjacent to the first positive current lead. The read head further comprises: a first negative voltage lead connected to the first SOT layer, a first positive voltage lead connected to the first SOT layer, a second positive voltage lead connected to the second SOT layer, the second positive voltage lead being disposed adjacent to the first negative voltage lead, and a second negative voltage lead connected to the second SOT layer, the second negative voltage lead being disposed adjacent to the first positive voltage lead.

The first free layer is disposed between the first shield and the non-magnetic layer, and wherein the second free layer is disposed between the non-magnetic layer and the second shield. The read head further comprises: a first soft bias side shield disposed adjacent to the first free layer at the MFS, a second soft bias side shield disposed adjacent to the first free layer at the MFS, a third soft bias side shield disposed adjacent to the second free layer at the MFS, a fourth soft bias side shield disposed adjacent to the second free layer at the MFS, a first Ru layer disposed between the first soft bias side shield and the third soft bias side shield, and a second Ru layer disposed between the second soft bias side shield and the fourth soft bias side shield. The first free layer is spaced from the first SOT layer by a first insulating layer, and wherein the second free layer is spaced from the second SOT layer by a second insulating layer. The first SOT layer and the second SOT layer each individually have a thickness of about 5 nm to about 20 nm, a height of about 100 nm to about 1 μm, and a width of less than about 100 nm. The non-magnetic layer extends between the sensor and the spin generator, and wherein the non-magnetic layer has a height of about 100 nm to about 300 nm, and wherein the non-magnetic comprises a first portion and a second portion, the first portion have a greater width than the second portion, wherein the first portion is disposed adjacent to the spin generator and the second portion is disposed adjacent to the sensor. The spin generator is disposed between the first shield and the second shield. A magnetic recording device comprises the magnetic recording head.

While the foregoing is directed to embodiments of the present disclosure, other and further embodiments of the disclosure may be devised without departing from the basic scope thereof, and the scope thereof is determined by the claims that follow.

What is claimed is:

1. A read head, comprising:
    a first shield;
    a second shield;
    a non-magnetic layer disposed between the first shield and the second shield;
    a sensor disposed between the non-magnetic layer and the second shield at a media facing surface (MFS), the sensor comprising a free layer, a first tunnel barrier layer, and a first cap layer, wherein the first tunnel barrier layer is disposed on the non-magnetic layer and the first cap layer is disposed on the free layer; and
    a spin generator disposed adjacent to the non-magnetic layer and recessed from the MFS by a first distance, the spin generator being spaced from the sensor, wherein the spin generator comprises a spin orbit torque (SOT) layer, a seed layer, and a second cap layer disposed on the SOT layer, wherein the first distance is greater than a height of the free layer as measured from the MFS, and wherein the seed layer is disposed on non-magnetic layer.

2. The read head of claim 1, wherein the spin generator is disposed between the non-magnetic layer and the second shield.

3. The read head of claim 1, further comprising:
    a negative voltage lead connected to the non-magnetic layer;
    a positive voltage lead connected to the second shield;
    a positive current lead connected to the SOT layer; and
    a negative current lead connected to the SOT layer, wherein the positive and negative current leads are aligned to provide a current path through the SOT layer in a cross-track direction.

4. The read head of claim 1, further comprising:
    a negative current lead connected to the first shield;
    a positive current lead connected to the second shield;
    a positive voltage lead connected to the SOT layer; and
    a negative voltage lead connected to the SOT layer.

5. The read head of claim 1, further comprising:
    a negative current lead connected to the non-magnetic layer;
    a positive current lead connected to the second shield;
    a positive voltage lead connected to the SOT layer; and
    a negative voltage lead connected to the SOT layer.

6. The read head of claim 1, wherein the SOT layer comprises a topological insulating material.

7. The read head of claim 6, wherein the topological insulating material is BiSb.

8. The read head of claim 1, wherein the non-magnetic layer comprises a first portion and a second portion, the first portion have a greater width than the second portion, wherein the first portion is disposed adjacent to the spin generator and the second portion is disposed adjacent to the sensor.

9. The read head of claim 1, wherein the spin generator is disposed between the non-magnetic layer and the first shield.

10. A magnetic recording head comprising the read head of claim 1.

11. A magnetic recording device comprising the magnetic recording head of claim 10.

12. A read head, comprising:
a first shield;
a second shield;
a non-magnetic layer disposed between the first shield and the second shield;
a sensor disposed between the non-magnetic layer and the second shield at a media facing surface (MFS), the sensor comprising a free layer, a first tunnel barrier layer and a first cap layer;
a spin generator disposed adjacent to the non-magnetic layer and recessed from the MFS by a first distance, the spin generator being spaced from the sensor, wherein the spin generator comprises a spin orbit torque (SOT) layer and a seed layer, and wherein the first distance is greater than a height of the free layer as measured from the MFS;
a negative voltage lead connected to the first shield;
a positive voltage lead connected to the second shield;
a positive current lead connected to the SOT layer; and
a negative current lead connected to the SOT layer, wherein the positive and negative current leads are aligned to provide a current path through the SOT layer in a cross-track direction.

13. A magnetic recording device, comprising:
a read head, the read head comprising:
a first shield, the first shield comprising a shield notch;
a second shield;
a non-magnetic layer disposed between the shield notch and the second shield;
a sensor disposed between the non-magnetic layer and the second shield at a media facing surface (MFS), the sensor comprising a free layer; and
a spin generator disposed recessed from the MFS, the spin generator being spaced from the sensor, wherein the spin generator comprises:
a first spin orbit torque (SOT) layer disposed between the first shield and the non-magnetic layer; and
a second SOT layer disposed between the non-magnetic layer and the second shield.

14. The magnetic recording device of claim 13, wherein the first SOT layer is disposed adjacent to the shield notch, and wherein the second SOT layer is disposed adjacent to the free layer.

15. The magnetic recording device of claim 13, wherein the non-magnetic layer extends between the sensor and the spin generator, and wherein the non-magnetic layer has a height of about 100 nm to about 300 nm.

16. The magnetic recording device of claim 13, wherein the read head further comprises:
a first negative current lead connected to the first SOT layer;
a first positive current lead connected to the first SOT layer;
a second positive current lead connected to the second SOT layer, the second positive current lead being disposed adjacent to the first negative current lead; and
a second negative current lead connected to the second SOT layer, the second negative current lead being disposed adjacent to the first positive current lead.

17. The magnetic recording device of claim 13, wherein the read head further comprises:
a first negative voltage lead connected to the first SOT layer;
a first positive voltage lead connected to the first SOT layer;
a second positive voltage lead connected to the second SOT layer, the second positive voltage lead being disposed adjacent to the first negative voltage lead; and
a second negative voltage lead connected to the second SOT layer, the second negative voltage lead being disposed adjacent to the first positive voltage lead.

18. The magnetic recording device of claim 13, wherein the read head further comprises a non-magnetic notch disposed between the shield notch and the non-magnetic layer.

19. The magnetic recording device of claim 13, wherein the spin generator is disposed between the first shield and the second shield.

20. A magnetic recording device, comprising:
a read head, the read head comprising:
a first shield;
a second shield;
a non-magnetic layer disposed between the first shield and the second shield;
a sensor disposed between the first shield and the second shield at a media facing surface (MFS), the sensor comprising a first free layer; and
a spin generator disposed recessed from the MFS, the spin generator being spaced from the sensor, wherein the spin generator comprises:
a first spin orbit torque (SOT) layer disposed between the first shield and the non-magnetic layer; and
a second SOT layer disposed between the non-magnetic layer and the second shield.

21. The magnetic recording device of claim 20, wherein the read head further comprises:
a first negative current lead connected to the first SOT layer;
a first positive current lead connected to the first SOT layer;
a second positive current lead connected to the second SOT layer, the second positive current lead being disposed adjacent to the first negative current lead; and
a second negative current lead connected to the second SOT layer, the second negative current lead being disposed adjacent to the first positive current lead.

22. The magnetic recording device of claim 20, wherein the read head further comprises:
a first negative voltage lead connected to the first SOT layer;
a first positive voltage lead connected to the first SOT layer;
a second positive voltage lead connected to the second SOT layer, the second positive voltage lead being disposed adjacent to the first negative voltage lead; and
a second negative voltage lead connected to the second SOT layer, the second negative voltage lead being disposed adjacent to the first positive voltage lead.

23. The magnetic recording device of claim 20, wherein the sensor further comprises a second free layer, wherein the first free layer is disposed between the first shield and the non-magnetic layer, and wherein the second free layer is disposed between the non-magnetic layer and the second shield.

24. The magnetic recording device of claim 23, wherein the read head further comprises:
- a first soft bias side shield disposed adjacent to the first free layer at the MFS;
- a second soft bias side shield disposed adjacent to the first free layer at the MFS;
- a third soft bias side shield disposed adjacent to the second free layer at the MFS;
- a fourth soft bias side shield disposed adjacent to the second free layer at the MFS;
- a first Ru layer disposed between the first soft bias side shield and the third soft bias side shield; and
- a second Ru layer disposed between the second soft bias side shield and the fourth soft bias side shield.

25. The magnetic recording device of claim 23, wherein the first free layer is spaced from the first SOT layer by a first insulating layer, and wherein the second free layer is spaced from the second SOT layer by a second insulating layer.

26. The magnetic recording device of claim 20, wherein the first SOT layer and the second SOT layer each individually have a thickness of about 5 nm to about 20, a height of about 100 nm to about 1 μm, and a width of less than about 100 nm.

27. The magnetic recording device of claim 20, wherein the non-magnetic layer extends between the sensor and the spin generator, and wherein the non-magnetic layer has a height of about 100 nm to about 300 nm, wherein the non-magnetic layer comprises a first portion and a second portion, the first portion have a greater width than the second portion, and wherein the first portion is disposed adjacent to the spin generator and the second portion is disposed adjacent to the sensor.

28. The magnetic recording device of claim 20, wherein the spin generator is disposed between the first shield and the second shield.

* * * * *